(12) United States Patent
Booher et al.

(10) Patent No.: US 10,683,043 B2
(45) Date of Patent: *Jun. 16, 2020

(54) PLATFORM TRAILER WITH REINFORCED NECK

(71) Applicant: East Manufacturing Corporation, Randolph, OH (US)

(72) Inventors: Howard D. Booher, Atwater, OH (US); Russell D. Pittman, Atwater, OH (US); Derek Davies, Louisville, OH (US)

(73) Assignee: East Manufacturing Corporation, Randolph, OH (US)

( * ) Notice: Subject to any disclaimer, the term of this patent is extended or adjusted under 35 U.S.C. 154(b) by 64 days.

This patent is subject to a terminal disclaimer.

(21) Appl. No.: 15/388,710

(22) Filed: Dec. 22, 2016

(65) Prior Publication Data

US 2017/0101141 A1 Apr. 13, 2017

Related U.S. Application Data

(63) Continuation of application No. 14/599,970, filed on Jan. 19, 2015, now Pat. No. 9,533,721, which is a (Continued)

(51) Int. Cl.
*B62D 53/06* (2006.01)
*B62D 21/20* (2006.01)
(Continued)

(52) U.S. Cl.
CPC ........... *B62D 53/061* (2013.01); *B62D 21/20* (2013.01); *B62D 29/008* (2013.01); *B62D 33/02* (2013.01); *B62D 53/08* (2013.01); *B62D 53/0842* (2013.01)

(58) Field of Classification Search
CPC .... B62D 53/061; B62D 29/008; B62D 33/02; B62D 53/08; B62D 53/0842
See application file for complete search history.

(56) References Cited

U.S. PATENT DOCUMENTS 2,417,640 A 3/1947 Fischbach
2,622,895 A 12/1952 Larsen
(Continued)

FOREIGN PATENT DOCUMENTS

EP 1 595 773 A2 11/2005

OTHER PUBLICATIONS

International Search Report dated May 9, 2013 for International application No. PCT/US2013/028777.
(Continued)

*Primary Examiner* — Tony H Winner
*Assistant Examiner* — Marlon A Arce
(74) *Attorney, Agent, or Firm* — Fay Sharpe LLP

(57) ABSTRACT

A platform trailer includes a neck reinforcement structure located in the neck region to provide for a reduced height in the neck region of the trailer to increase the cargo-carrying capacity of the trailer. The height in the neck region of the trailer is less than 30% of the height in the rest of the trailer. A fifth wheel plate includes a main portion secured to both the first and second beams of the trailer. The fifth wheel plate includes a bifurcated tail portion including a first tail portion connected to the first beam and a second tail portion connected to the second beam. A kingpin is connected to the fifth wheel plate and is adapted to be engaged by an associated tractor fifth wheel.

8 Claims, 28 Drawing Sheets

Related U.S. Application Data continuation of application No. 13/783,258, filed on Mar. 2, 2013, now Pat. No. 8,936,277.

(60) Provisional application No. 61/606,361, filed on Mar. 2, 2012, provisional application No. 61/702,921, filed on Sep. 19, 2012.

(51) Int. Cl.
  *B62D 29/00* (2006.01)
  *B62D 53/08* (2006.01)
  *B62D 33/02* (2006.01)

(56) References Cited

U.S. PATENT DOCUMENTS

| | | | |
|---|---|---|---|
| 2,812,192 A | 11/1957 | Cole | |
| 3,580,611 A | 5/1971 | McNitt | |
| 3,598,421 A | 8/1971 | Mason, Jr. | |
| 3,705,732 A | 12/1972 | Marinelli | |
| 3,759,547 A * | 9/1973 | Ankeny | B60D 1/143 |
| | | | 280/491.5 |
| 3,909,059 A | 9/1975 | Benninger et al. | |
| 3,990,720 A | 11/1976 | Schwartz | |
| 4,226,465 A | 10/1980 | McCullough | |
| 4,288,957 A | 9/1981 | Meehan | |
| 4,564,233 A | 1/1986 | Booher | |
| 4,758,128 A | 7/1988 | Law | |
| 4,787,669 A | 11/1988 | Wante | |
| 4,806,065 A | 2/1989 | Holt et al. | |
| 4,863,189 A * | 9/1989 | Lindsay | B60P 3/32 |
| | | | 280/789 |
| 4,938,524 A | 7/1990 | Straub et al. | |
| 5,210,921 A | 5/1993 | Booher | |
| 5,242,185 A | 9/1993 | Carr et al. | |
| 5,322,314 A | 6/1994 | Blum | |
| 5,351,990 A * | 10/1994 | Thomas | B62D 25/2054 |
| | | | 280/789 |
| 5,417,453 A | 5/1995 | VanDenberg | |
| 5,474,331 A | 12/1995 | Booher | |
| H1587 H * | 9/1996 | Van Valkenburgh | 280/789 |
| 5,744,197 A | 4/1998 | Van Eck | |
| 6,109,684 A | 8/2000 | Reitnouer | |
| 6,254,132 B1 | 7/2001 | Lindsay | |
| 6,729,816 B2 | 5/2004 | Booher | |
| 7,156,422 B2 | 1/2007 | Verhaeghe | |
| 7,181,889 B2 | 2/2007 | Perkowski | |
| 7,264,305 B2 | 9/2007 | Kuriakose | |
| 7,287,780 B2 | 10/2007 | Reese et al. | |
| 7,571,953 B2 | 8/2009 | Adams | |
| 7,677,625 B2 | 3/2010 | Gosselin et al. | |
| 7,770,928 B2 | 8/2010 | Booher | |
| 7,798,558 B2 | 9/2010 | Messier | |
| 8,215,240 B2 | 7/2012 | Graaff et al. | |
| 8,562,022 B2 | 10/2013 | Nadeau et al. | |
| 2006/0071506 A1 | 4/2006 | Adams | |
| 2007/0069500 A1* | 3/2007 | Bloodworth | B62D 53/0842 |
| | | | 280/433 |
| 2009/0160163 A1 | 6/2009 | Gosselin et al. | |
| 2010/0199879 A1 | 8/2010 | Graaff et al. | |
| 2012/0104796 A1 | 5/2012 | Balaz et al. | |

OTHER PUBLICATIONS

Written Opinion dated May 9, 2013 for International application No. PCT/US2013/028777.

International Preliminary Report on Patentability dated May 12, 2015 for International application No. PCT/US2013/028777.

Letter regarding Co-Pending U.S. Appl. No. 14/453,202, filed Aug. 6, 2014.

Letter regarding Co-Pending U.S. Appl. No. 15/598,926, filed May 18, 2017.

\* cited by examiner

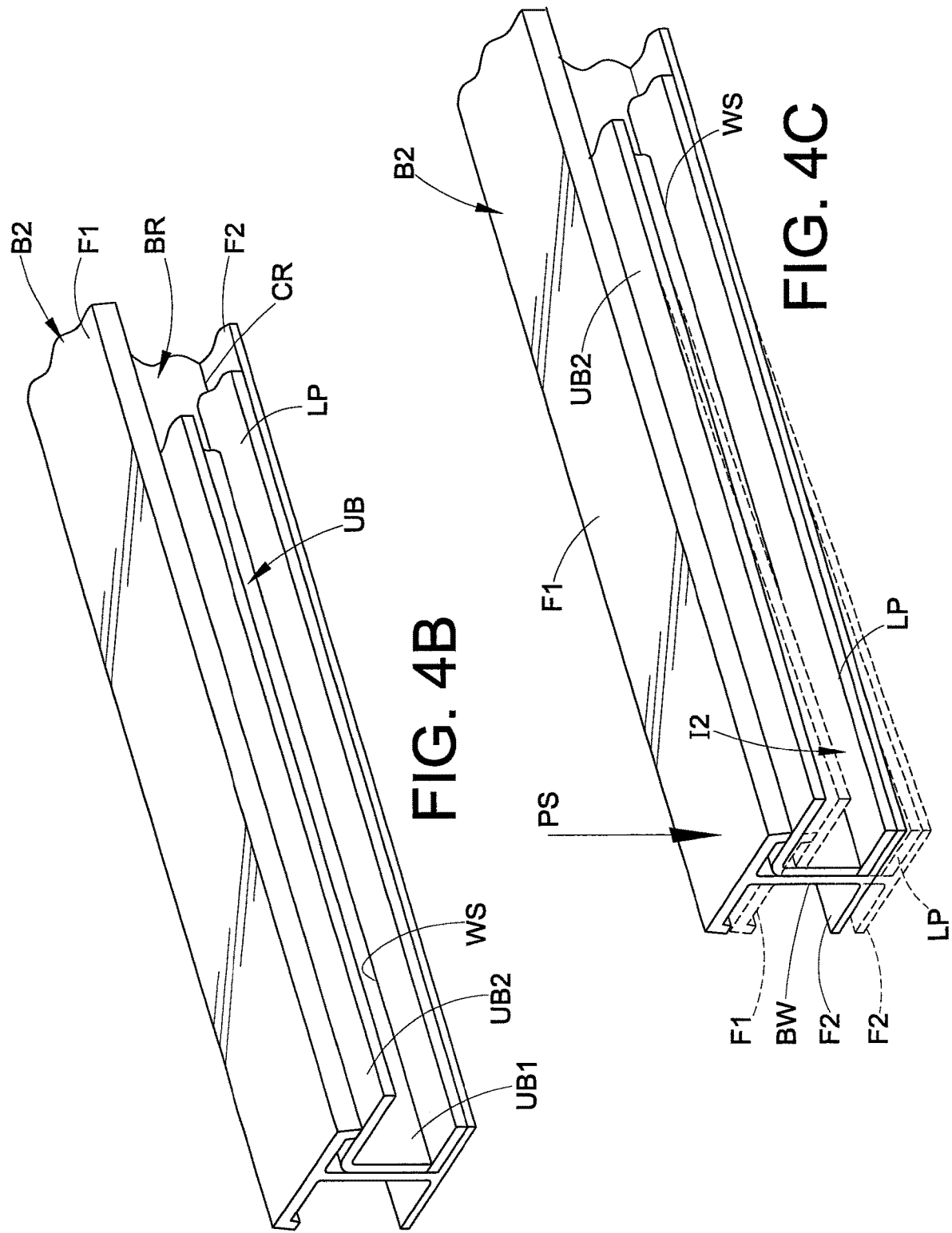

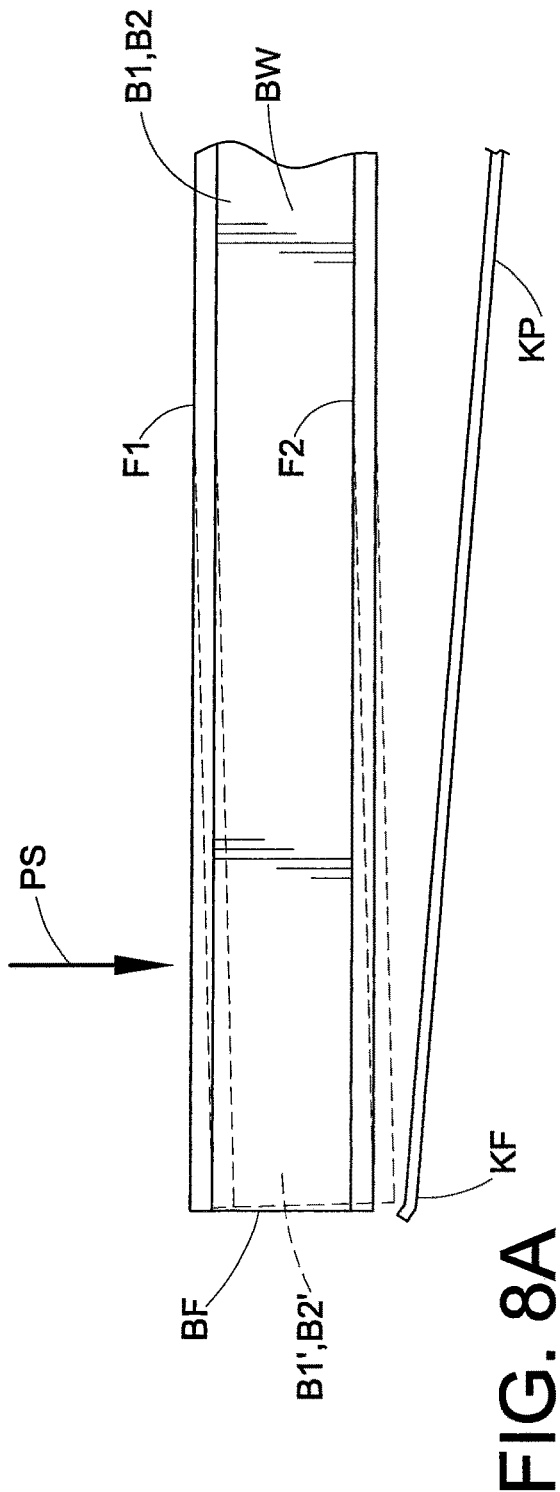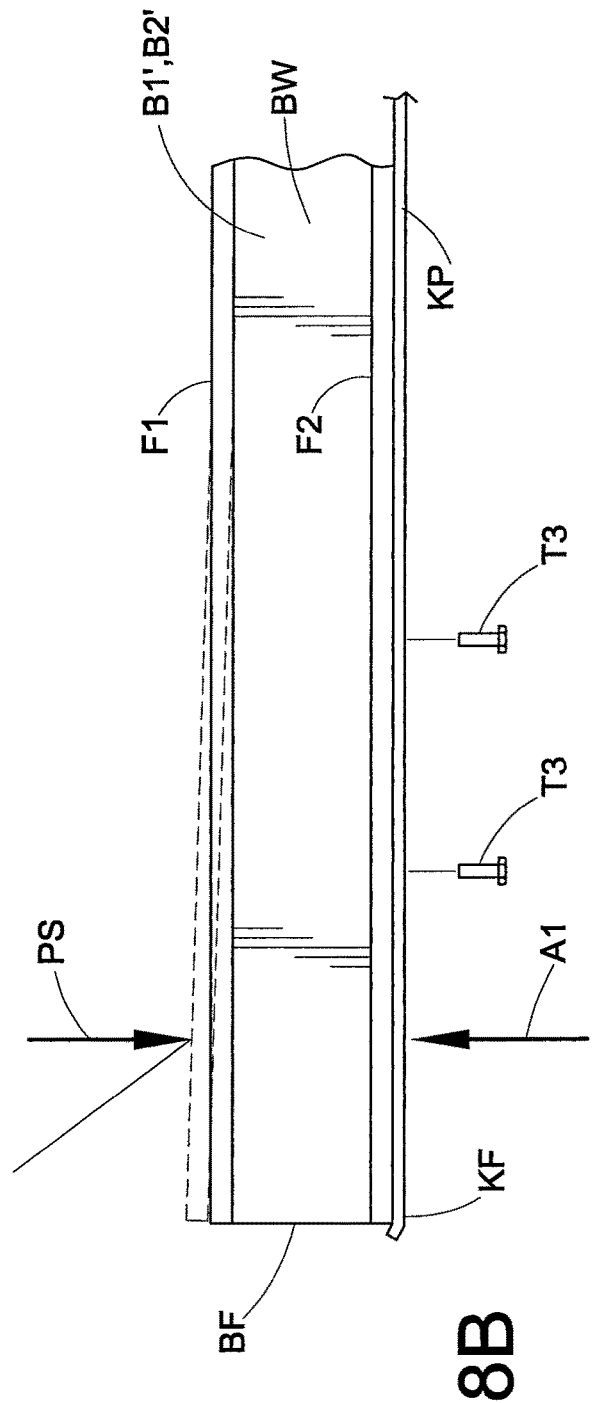

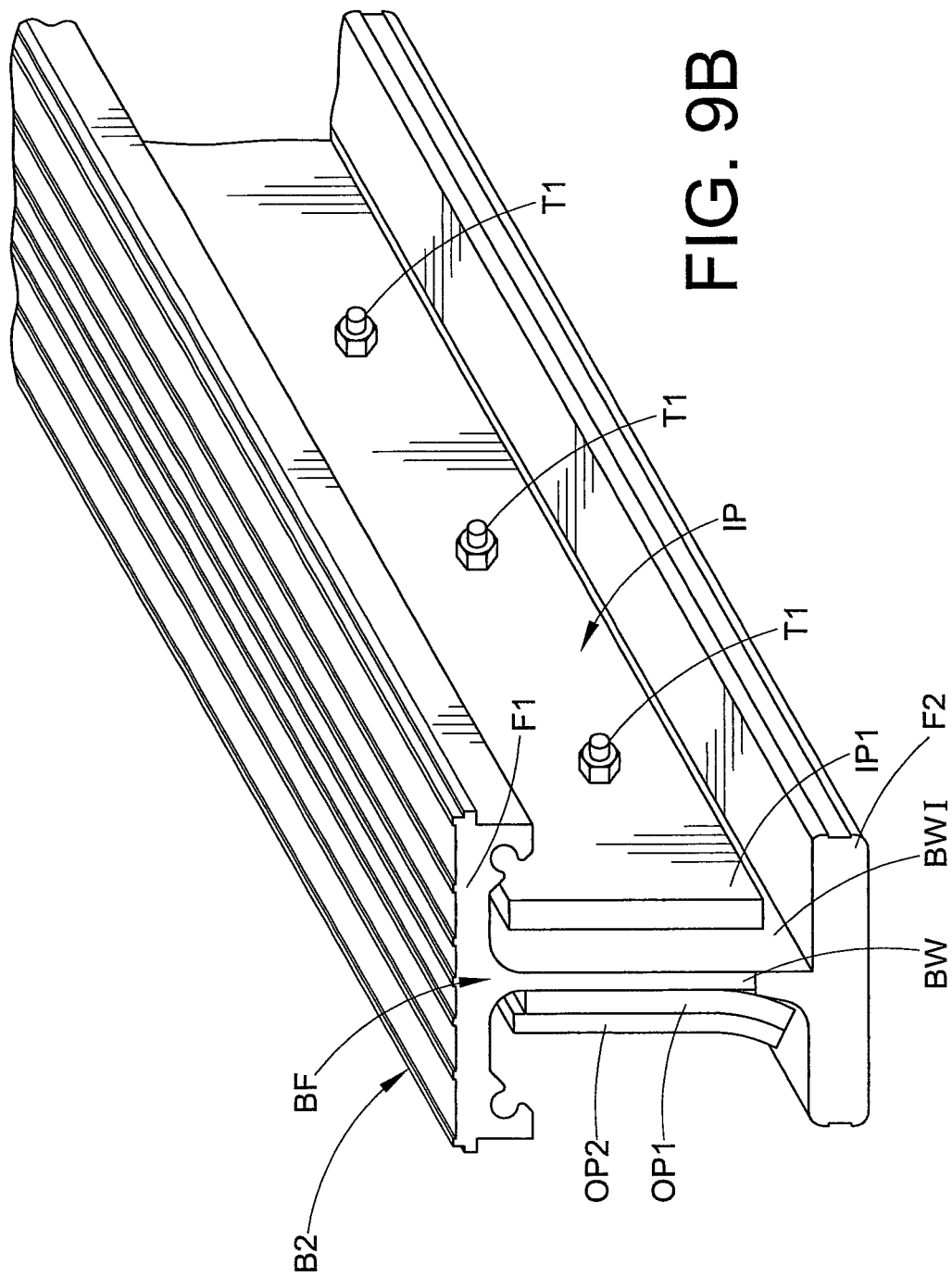

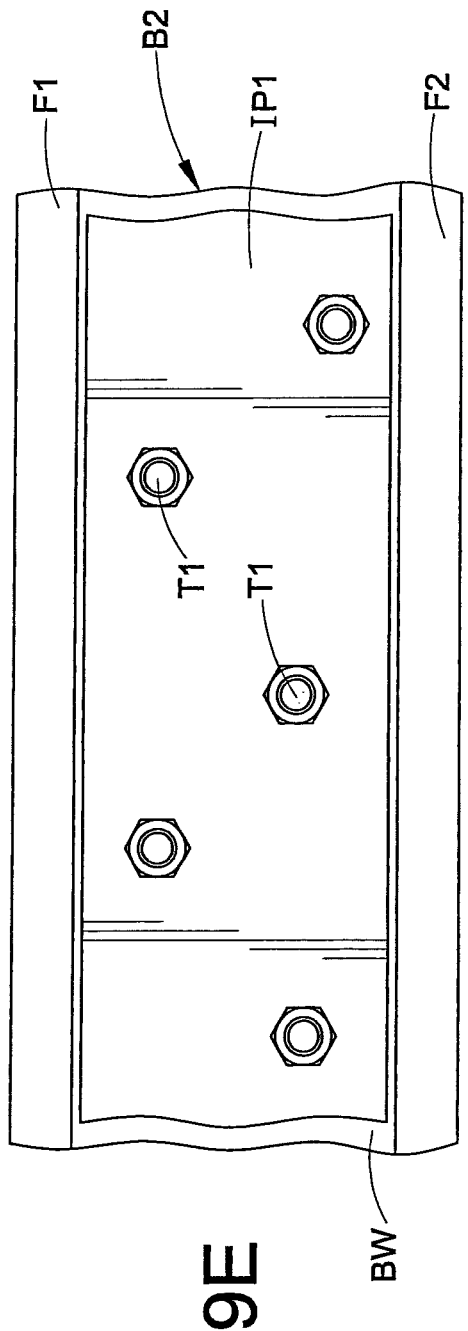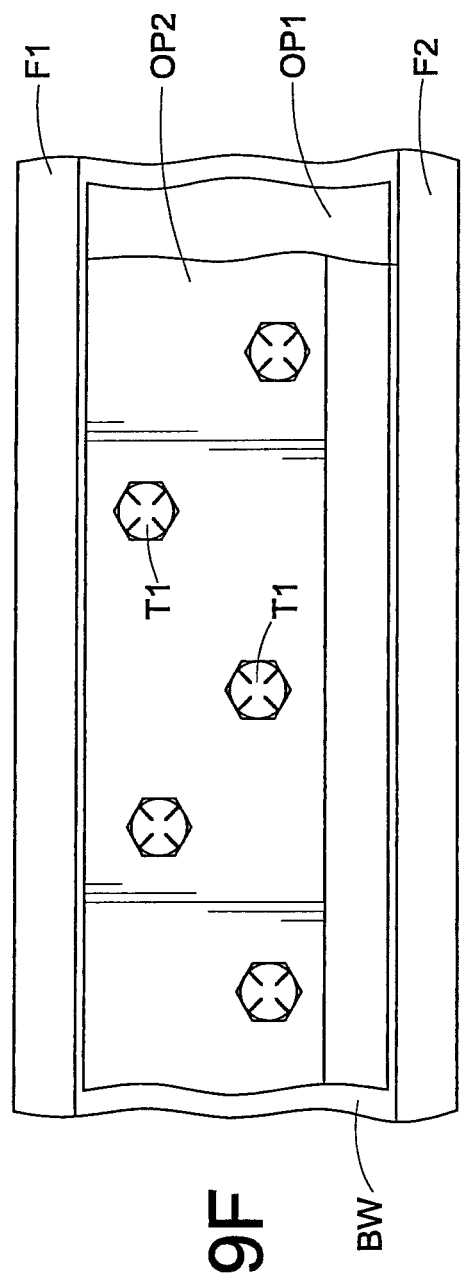

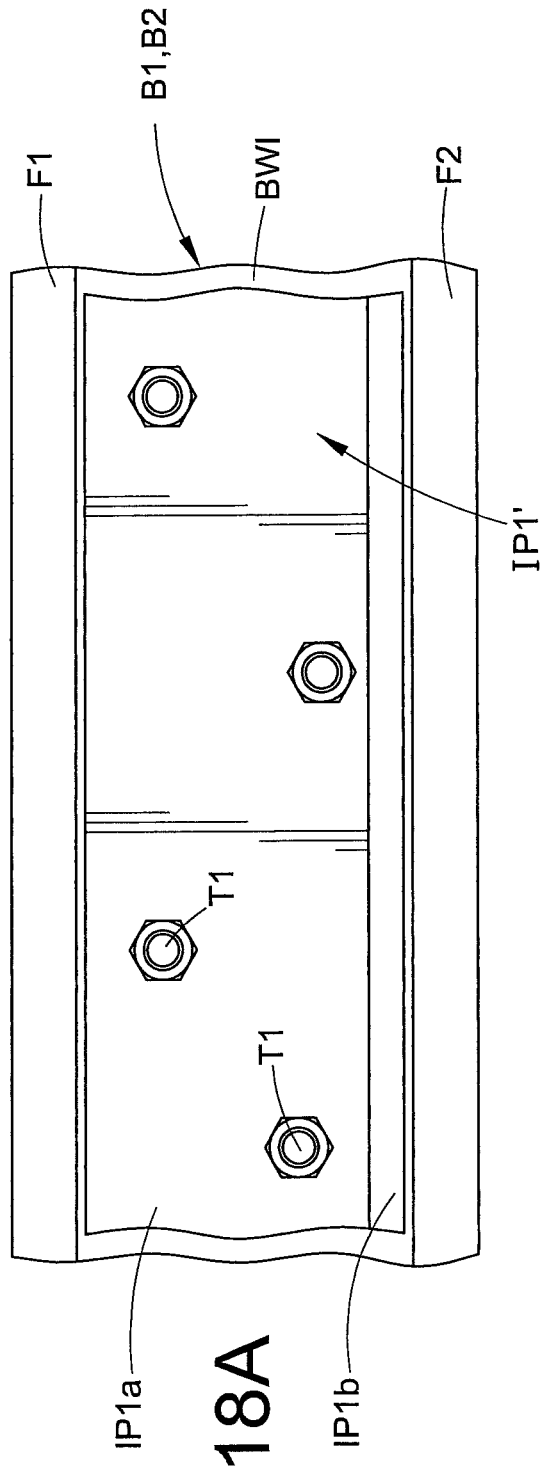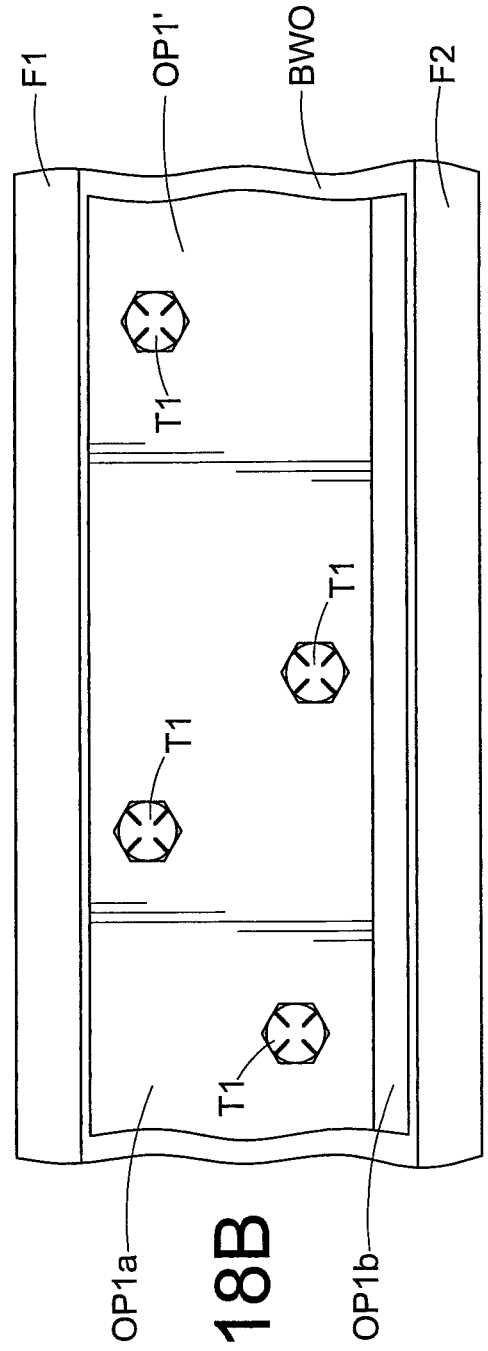

PLATFORM TRAILER WITH REINFORCED NECK

CROSS-REFERENCE TO RELATED APPLICATIONS

This application is a continuation of U.S. application Ser. No. 14/599,970 filed Jan. 19, 2015 (Jan. 19, 2015), now assigned U.S. Pat. No. 9,533,721, which is a continuation of U.S. application Ser. No. 13/783,258 filed Mar. 2, 2013 (Mar. 2, 2013), now U.S. Pat. No. 8,936,277, which claims priority from and benefit of the filing date of: (i) U.S. provisional patent application Ser. No. 61/606,361 filed Mar. 2, 2012 (Mar. 2, 2012), and, (ii) U.S. provisional patent application Ser. No. 61/702,921 filed Sep. 19, 2012 (Sep. 19, 2012), and the entire disclosure of each of said prior applications is hereby expressly incorporated by reference into the present specification.

BACKGROUND

Platform or "flatbed" trailers manufactured using main beams defined from aluminum alloy are becoming increasingly popular as compared to those manufactured using main beams defined from steel. These platform trailers manufactured using aluminum beams have traditionally been manufactured using beams that have a height in the neck region of the trailer that is greater than 10 inches to provide the neck region of the trailer with sufficient strength. The height of these aluminum beams in the neck region of known trailers negatively impacts the cargo carrying capacity of the trailer by reducing the height of the load that can be transported on the trailer while keeping the overall height of the load below the maximum height required by law and/or by bridges, overpasses, or like structures under which the trailer and load must pass. This reduction in load height negatively impacts the ability to use aluminum beam platform trailers including "curtainside" or other canopy structures, because the height of the canopy structure must be reduced correspondingly with the increase in beam height in the neck region to ensure that the canopy structure does not have an overall height greater than legal or other limits, which constrains the amount of cargo that can be hauled inside a curtainside or other canopied platform trailer manufactured using aluminum beams. Trailers manufactured using steel beams instead of aluminum have reduced the height of the beams in the neck region to less than 10 inches (e.g., 8 inches), but the steel beams are susceptible to corrosion and add to the empty weight of the trailer which decreases load capacity and increases fuel consumption.

In light of the foregoing, a need has been identified for a platform trailer manufactured using aluminum beams that have a height in the neck region that is substantially less than 10 inches while still having sufficient strength for the trailer to carry coils of steel and other heavy and concentrated loads.

SUMMARY

In accordance with one aspect of the present development, a platform trailer includes a forward end and a rear end spaced apart from each other along a longitudinal axis, and includes a midpoint located halfway between said forward end and said rear end. A cargo supporting platform extends between the forward end and the rear end and includes left and right laterally spaced-apart sides. A chassis supports the platform and includes first and second beams that extend parallel to said longitudinal axis and that each include a first height H1 at the midpoint. At least one axle assembly is connected to the chassis between the midpoint and the rear end and includes left and right rotatable wheel and tire assemblies. The forward end of the trailer includes a neck region where the first and second beams each include a second height H2 that is less than the first height H1. The trailer further includes a neck reinforcement structure located in the neck region. The neck reinforcement structure includes a first beam reinforcement structure located adjacent an inner side of the first beam that is oriented toward the second beam, and a second beam reinforcement structure located adjacent an inner side of the second beam that is oriented toward the first beam. A plurality of internal cross members extend between and interconnect the first and second beam reinforcement structures. A fifth wheel plate is fixedly secured to and that extends between both the first and second beams. A kingpin is connected to the fifth wheel plate and is adapted to be engaged by an associated tractor fifth wheel.

BRIEF DESCRIPTION OF DRAWINGS

FIGS. 4A, 4B, 4C, and 4D illustrate steps of method for manufacturing a reinforced trailer neck in accordance with an embodiment of the present development;

FIGS. 8A and 8B illustrate a method of manufacturing a trailer with a reinforced trailer neck according to FIG. 5 or FIG. 6;

FIGS. 9A and 9B are perspective views that show the second beam B2 and the outer reinforcement plates OP (FIG. 9A) and inner reinforcement plate IP (FIG. 9B);

FIGS. 9E and 9F provide inner and outer side views of a beam including a beam reinforcement structure according to FIG. 9;

FIG. 18A is an inner side view taken according to the arrows 18A of FIG. 18; and, FIG. 18B is an outer side view taken according to the arrows 18B of FIG. 18.

DETAILED DESCRIPTION

Figure 1A:
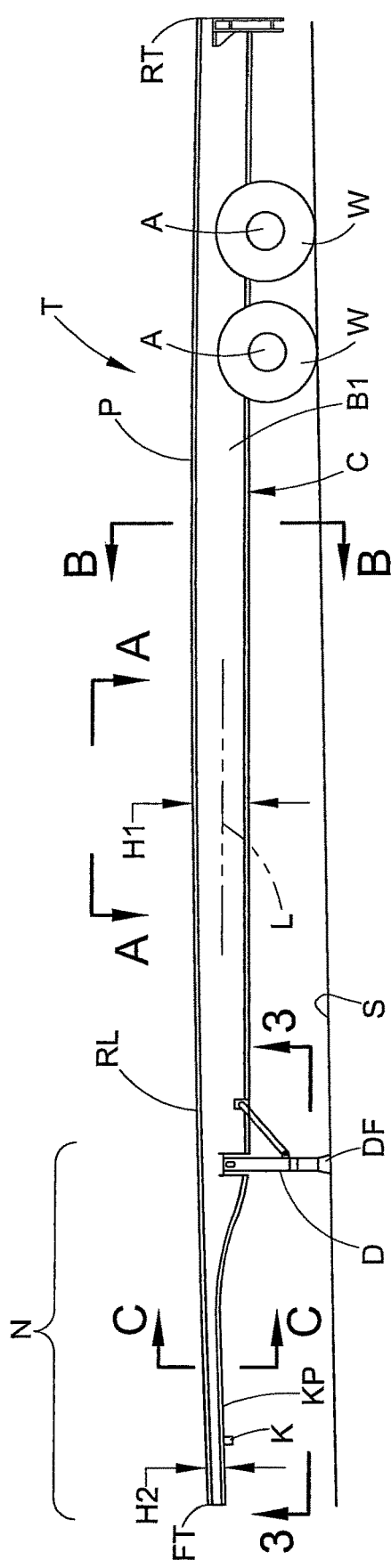
FIGS. 1A and 1B are left (driver side) and right (passenger side) elevation views, respectively, of a platform semi-trailer formed in accordance with the present development.
Figure 1B:
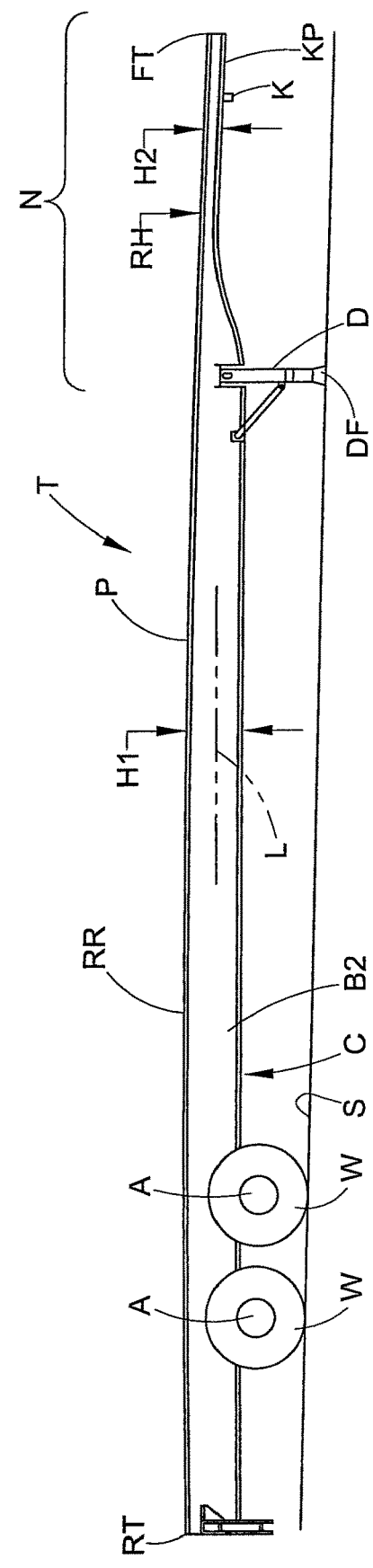
Figure 2A:
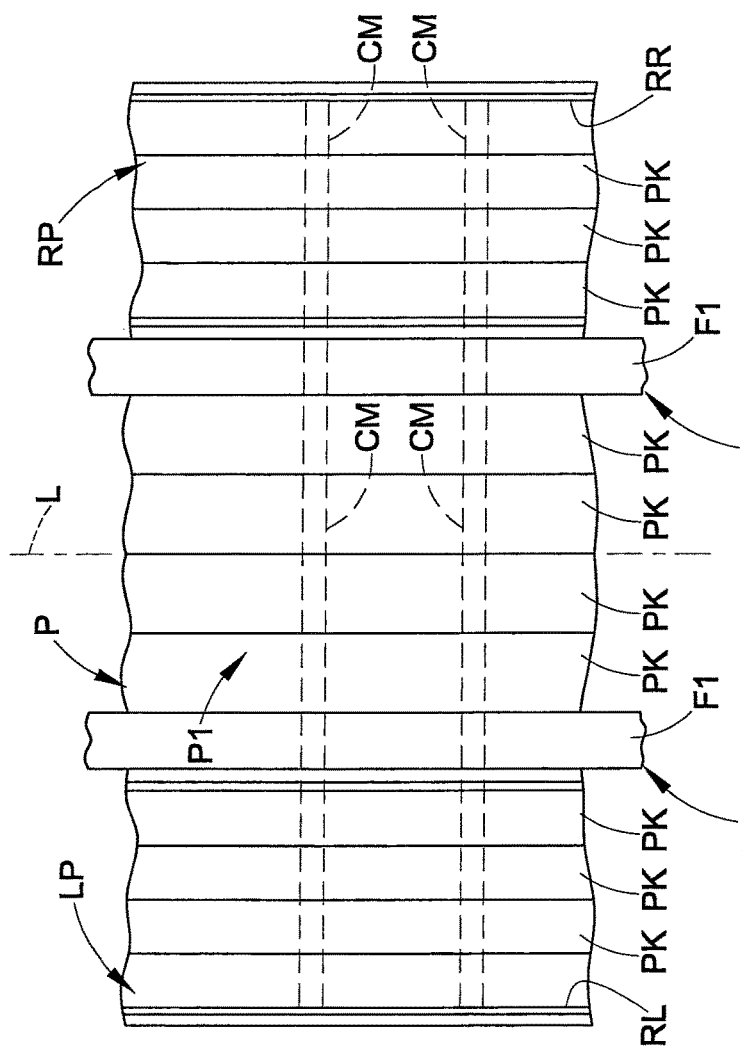
FIG. 2A is a partial plan view of the trailer as taken at line A-A of FIG. 1A.
Figure 2B:
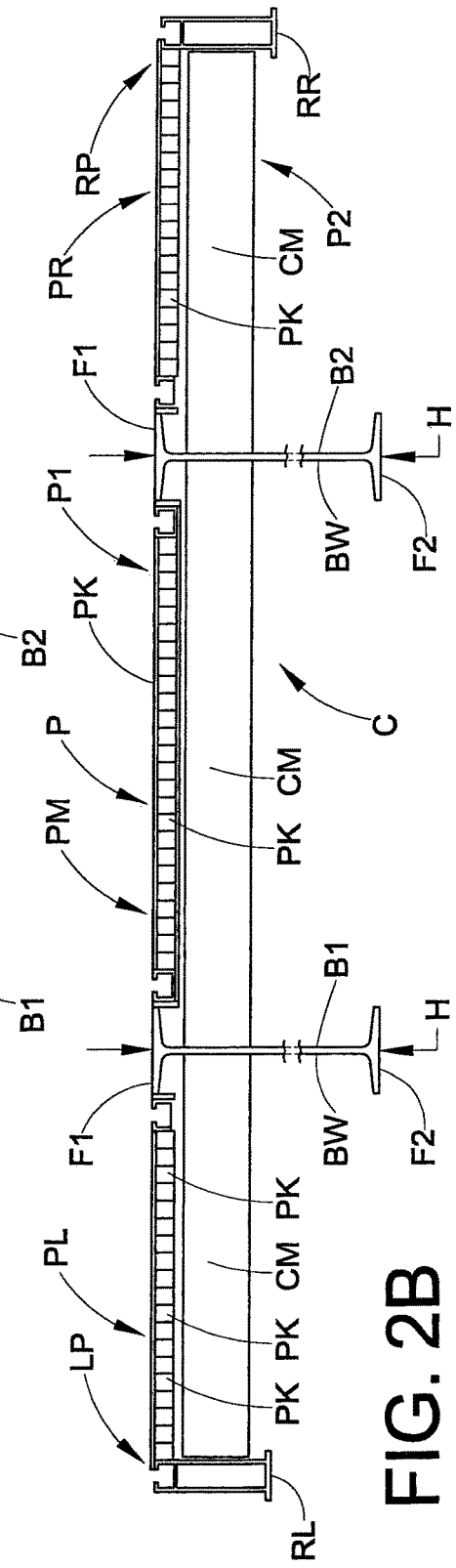
FIG. 2B is a section view of the trailer of FIG. 1A as taken at line B-B of FIG. 1A.

FIGS. 1A and 1B are left (driver side) and right (passenger side) elevation views, respectively, of a platform or "flatbed" semi-trailer T formed in accordance with the present development. The trailer T is adapted to be connected to and pulled by a tractor/truck (not shown). The trailer T comprises a forward edge or forward end FT and a rear edge or end RT spaced-apart from each other on a longitudinal axis L. FIG. 2A is a partial plan view of the trailer T as taken at line A-A of FIG. 1A, and FIG. 2B is a section view of the trailer T as taken along view line B-B of FIG. 1A.

Referring to FIGS. 1A-2B, it can be seen that the trailer T further comprises a cargo-supporting platform P including left and right laterally spaced-apart sides LP,RP. The forward edge or forward end FT of the trailer T and the rear edge or rear end RT of the trailer are defined by the opposite ends of the cargo-supporting platform P spaced a maximum distance from each other along the longitudinal axis L. The platform P is supported by and connected to a frame or chassis C that includes first (left) and second (right) spaced-apart main beams B1,B2 that extend parallel to each other and to the longitudinal axis L from the forward end FT to the rear end RT. Each beam B1,B2 defines an I-beam profile comprising an upper flange F1 and a lower flange F2 (FIG. 2B) connected by a web BW. The beams are aluminum alloy (sometimes referred to herein simply as "aluminum") beams that are fabricated by welding or otherwise, e.g., by abutting and welding together or otherwise connecting two separate T-shaped aluminum alloy extrusions. A suitable aluminum alloy for the beams is 6061-T6, although other suitable aluminum alloys can be used without departing from the present development. The beams B1,B2 are preferably prearched, i.e., manufactured such that at least the upper flange F1 has an arched configuration during fabrication, with the apex of the arch being oriented upward and located along the upper flange F1 generally near a midpoint along the longitudinal axis L of the trailer, i.e., halfway between the forward end FT and rear end RT of the trailer.

A kingpin K is located at the forward end FT of the trailer T, centrally located between and connected to the beams B1,B2 by a fifth-wheel plate KP, and is adapted to be engaged by a fifth-wheel of an associated tractor/truck for towing the trailer T. The rear end RT of the trailer includes at least one and typically at least two axle assemblies A connected to the chassis, e.g., to the lower flanges F2 of beams B1,B2. Each axle assembly A comprises at least one left and at least one right rotatable wheel and tire assemblies W for movably supporting the trailer T on a road or other surface S. The trailer T further comprises a dolly assembly D, typically located axially between the kingpin K and an axial midpoint of the trailer T. The dolly assembly D includes support feet DF that are selectively lowered to support the forward end FT of the trailer T when the kingpin is not connected to an associated tractor/truck (the dolly assembly D is shown only in FIGS. 1A & 1B for clarity).

The platform P comprises left and right side rails RL,RR that delimit the opposite lateral sides LP,RP of the platform, respectively. These side rails RL,RR are each typically defined as one-piece or monolithic extrusions of aluminum alloy having a profile such as that shown in FIG. 2B and that extend in one piece from the forward end FT to the rear end RT of the trailer T parallel to the beams B1,B2 and the longitudinal axis L (the profiles of the side rails RL,RR are typically mirror images of each other as shown herein). The side rails RL,RR and the beams B1,B2 are arched as shown in FIGS. 1A and 1B with an apex of the arch oriented upward and located between the forward and rear ends FT,RT.

The platform P, itself, comprises a plurality of wood and/or metal longitudinally extending platform members PK, each of which extends longitudinally from the forward end FT to the rear end RT of the trailer, as one-piece or otherwise to define an upper cargo-supporting surface P1. Typically, the platform members PK comprise aluminum extrusions and/or wooden planks or the like. Regardless of the material used to define the platform members PK, it should be noted that they are shown as extending longitudinally between the forward and rear trailer ends FT,RT, but can alternatively extend laterally or transversely between the left and right side rails RL,RR. In the illustrated trailer embodiment, the upper flange F1 of each beam B1,B2 also defines part of the platform P and is arranged to lie substantially flush with the platform members PK located on its opposite lateral sides. Because of its arched shape, the platform P is highest above the support surface S between the front and rear trailer ends FT,RT.

To support the longitudinally extending platform members PK, the platform P further comprises a plurality of transversely extending cross members CM located beneath the platform members PK at axially spaced intervals along the entire length of the trailer. The cross members CM are welded or otherwise connected to and extend between the left and right side rails RL,RR, passing through the web BW of the beams B1,B2 (in some cases the cross members CM comprise three separate cross member sections or "stubs" located respectively beneath and supporting the left, middle and right platform sections and abutted with the beams B1 and/or B2 instead of a single member that passes through both of the beams B1,B2). These cross members CM can have a variety of shapes, e.g., I-beam, U-shaped, C-shaped, etc. and are defined from aluminum extrusions or the like.

The forward region of the trailer T where the kingpin K is located is referred to as the neck or neck region N, due to the fact that the beams B1,B2 in this region are reduced in overall height in this region to accommodate the mating connection of a truck/tractor with the kingpin K (beam height H is measured between the outer surface of each flange F1,F2 as shown in FIG. 2B). For ease of reference, the neck region N is defined as beginning adjacent the dolly assembly D, at a point where the height H of the beams B1,B2 begins to decrease from a full height in a central portion (including the midpoint) of the trailer located axially between the dolly assembly D and the forward most axle A to a reduced height, and this neck region N continues forward from such point where the height H of the beams B1,B2 begins to decrease and extends to the forward edge of the trailer T. As shown in FIG. 1A, the beams B1,B2 define a full or maximum first height H1 at a primary load carrying location axially between the dolly assembly D and the wheel and tire assemblies W, and the beams B1,B2 define a reduced or second height H2 in the neck region N (as measured at the axial location of the kingpin K), wherein H2<H1. In one non-limiting example, H1=21 inches or more and H2=10 inches or less. For example, H2=6 inches or less, or H2=5 inches or less in certain embodiments disclosed herein, and in other embodiments, H2=4 inches or less (e.g., 3.75 inches). For all embodiments disclosed herein, it is not intended that the first height H1 and/or the second height H2 be limited to any particular dimensions unless specifically recited in the claims. Although trailers manufactured with steel main beams are known to have a beam height of 8 inches or less in the neck region, prior attempts to reduce the beam height H2 in the neck region N for aluminum alloy main beams B1,B2 to a height of less than 10 inches have failed to provide a trailer neck N that is strong enough for a trailer used to support and transport heavy concentrated loads such as steel coils. As such, the present trailer T comprises a reinforced neck N that counteracts the effects of reducing the beam height H2 in the neck region N to a value H2 that is less than 10 inches. In one preferred embodiment, the height H2 is less than or equal to 8 inches (H2≤8 inches, e.g., 7.75 inches), which places the height of the platform P in the neck region N (as measured adjacent at the kingpin K) at about 54 inches above the roadway or other support surface S on which the trailer T is supported (based upon the tractor fifth wheel being located 46 inches above the road support surface S). This 54 inch platform height can increase the cargo capacity of the trailer T, especially if a curtain side cover or other cover is connected to the trailer that must have a maximum vertical height below a certain allowable limit, i.e., given a maximum allowed overall trailer height, a lower beam height H2 in the neck region N will allow for a corresponding increase in the height of any curtain side structure or other enclosure connected to the trailer T which will correspondingly increase the cargo capacity of the trailer T. In another embodiment, the height H2≤6 inches (e.g., 5.75 inches or 4.75 inches), and in still another embodiment, H2≤4 inches (e.g., 3.75 inches).

Figure 2C:
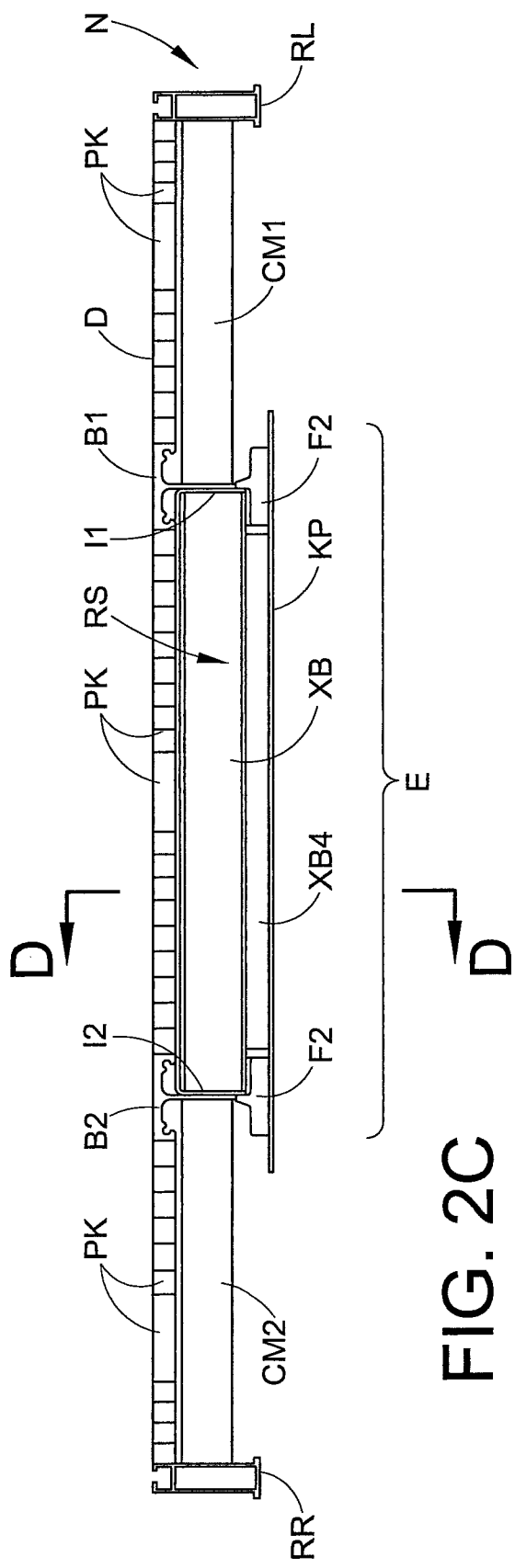
FIG. 2C is a simplified section view taken at line C-C of FIG. 1A.
Figure 2D:
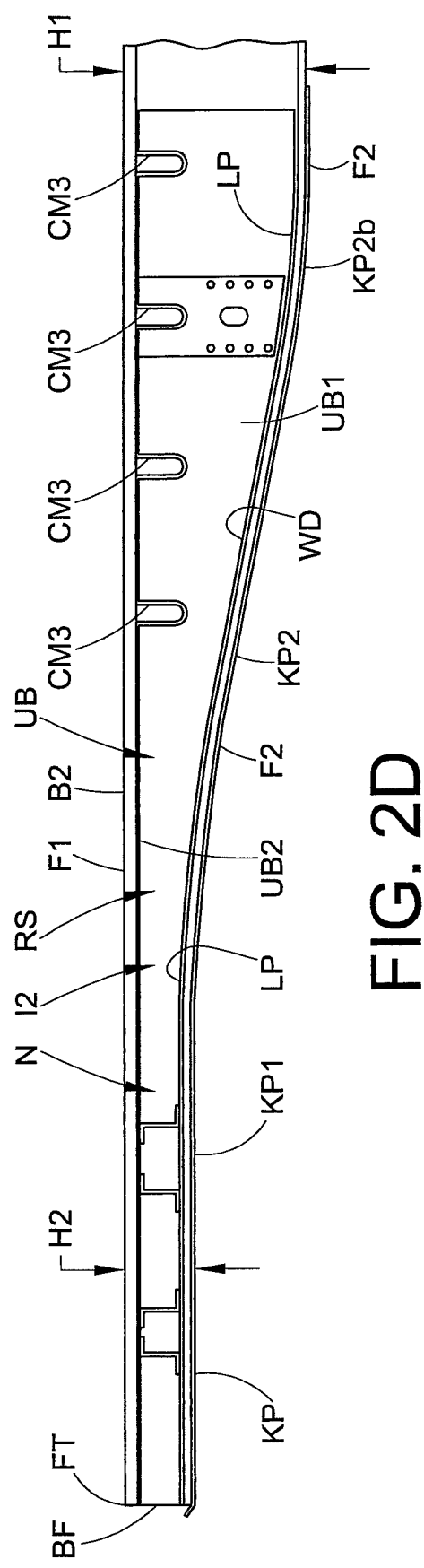
FIG. 2D is a simplified partial section view taken at line D-D of FIG. 2C.
Figure 2E:
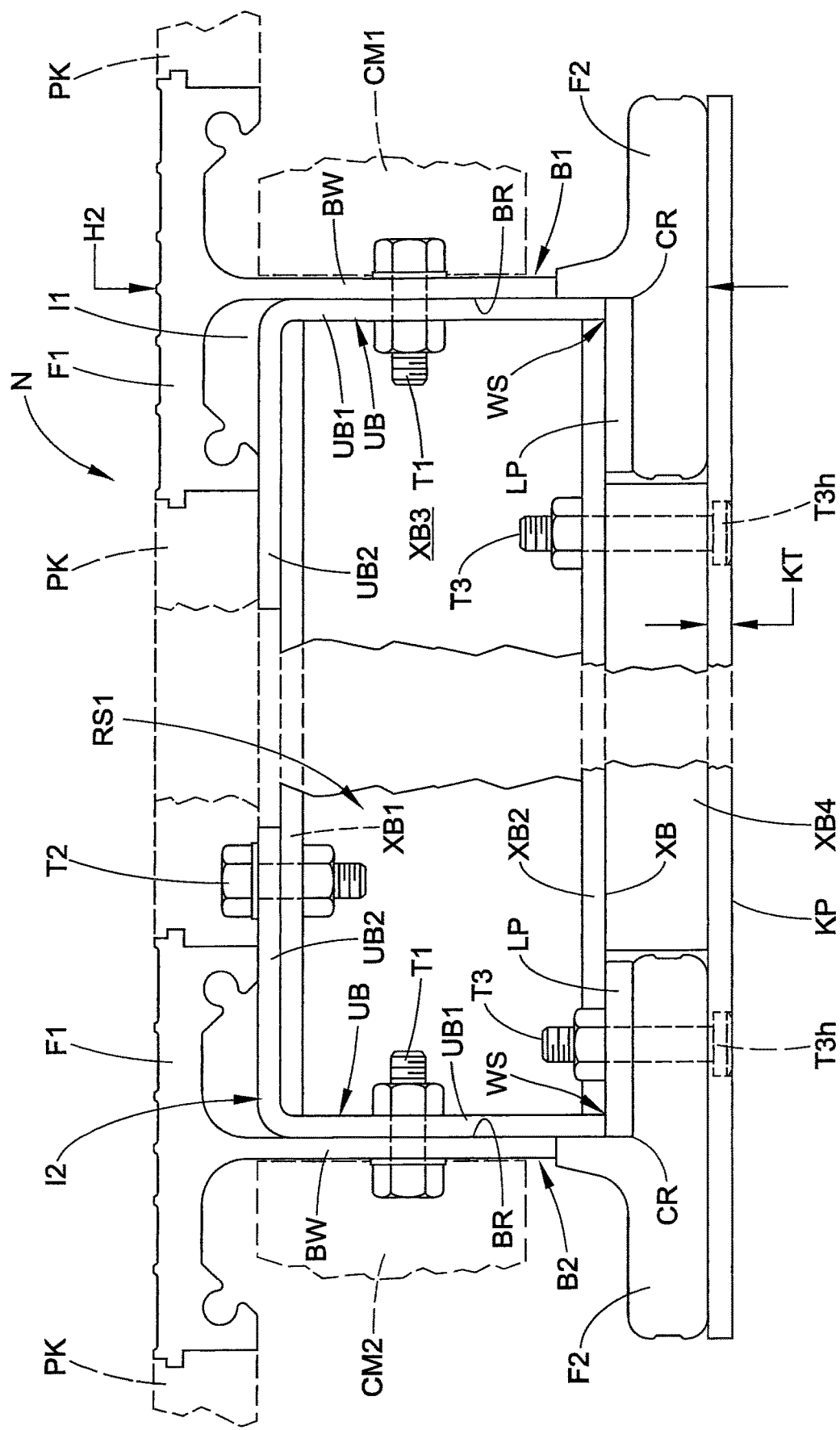
FIG. 2E is an enlarged detail view of portion E of FIG. 2C.

The structure of the reinforced neck N of the trailer T is shown in FIGS. 2C, 2D, and 2E. FIG. 2C is a simplified section view taken at line C-C of FIG. 1A, FIG. 2D is a simplified partial section view taken at line D-D of FIG. 2C, and FIG. 2E is an enlarged detail view of portion E of FIG. 2C. The reinforced neck N comprises a reinforcement structure RS1 comprising a first beam reinforcement structure or beam insert I1 connected to an inner region of the first beam B1, and a second beam reinforcement structure or beam insert I2 connected to an inner region of the second beam B2 (the inner region of each beam B1,B2 is the portion that faces the other beam B1,B2). The first and second beam inserts I1,I2 are arranged in spaced-apart facing relation with respect to each other. The neck reinforcement structure RS1 further comprises at least one and preferably a plurality of internal cross members XB that extend between and interconnect the first and second beam inserts I1,I2. As shown, the reinforcement structure RS1 comprises a plurality of internal cross members XB that are arranged perpendicular to the trailer longitudinal axis L and parallel and spaced-apart relative to each other. In the illustrated embodiment, at least some of the internal cross members XB are Z bar members that have a z-shaped cross-sectional profile. The reinforcement structure RS1 further comprises a specialized fifth-wheel plate KP described further below.

As noted, the first and second beam inserts I1,I2 are respectively connected to the inner regions of the first and second beams B1,B2, wherein the inner region is the portion of the beam B1,B2 that is facing inwardly toward the other beam B1,B2. Referring also to FIG. 2E, it can be seen that the inner region of each beam B1,B2 comprises a C-shaped recess BR defined between the web BW and the upper and lower flanges F1,F2 on the inner side of the beam B1,B2 that faces the other beam B1,B2. The recess BR preferably comprises a lower corner CR defined at the intersection of the lower flange F2 and the web BW, and this lower corner CR defines at least substantially a 90 degree or right angle.

Referring particularly to FIGS. 2D & 2E, each of the first and second beam inserts I1,I2 comprises a lower plate LP that is located in the recess BR and supported on the lower flange F2. The lower plate LP is fitted closely into the lower corner CR substantially without any gaps between the lower plate LP and the corner CR, and extends inwardly toward the centerline of the trailer T to a location where its inner edge lies substantially flush with the inner edge of the lower flange F2. The lower plate LP is preferably a one-piece plate that extends from a forward end located adjacent the forward end BF (FIG. 2D) of the beams B1,B2 adjacent the forward end FT of the trailer T and that extends longitudinally along the lower flange F2 for at least substantially all of the neck region N of the trailer, and the lower plate LP thus follows the contour of the lower flange F2 in the neck region as shown in FIG. 2D and preferably extends axially toward the rear RT of the trailer beyond the neck region N. Each of the first and second beam inserts I1,I2 also comprises a brace or upper brace UB comprising a first leg UB1 that abuts the beam web BW and a second leg UB2 that lies perpendicular to the first leg UB1 and that extends from the first leg UB1 out of the recess BR beyond the upper flange F1. The second leg UB2 preferably contacts at least part of the upper flange F1 as shown. The upper brace UB extends longitudinally rearward from a front end located adjacent the front end BF of the beams B1,B2 to a rear end that is located rearward of the neck region N. In one embodiment, the upper brace UB and lower plate LP extend coextensively in the axial direction. The upper brace UB is preferably provided as a one-piece angle member, but can be fabricated from two or more pieces that are welded together or otherwise connected. Likewise, the lower plate LP and the upper brace UB can alternatively be provided as a one-piece structure.

Adjacent the lower corner CR of the beam recess BR, the lower plate LP and first leg UB1 of the upper brace are located close or contact each other such that a weld seam WS is defined. The lower corner CR is sufficiently right-angled such that the lower plate LP extends at least substantially and preferably completely under the thickness of the first leg UB1 of the upper brace UB. The lower plate LP and the upper brace UB are connected to each other by a continuous weld WD (see FIG. 2D) that extends axially along the entire extent of the weld seam WS for the whole axial length of the trailer neck region N. A plurality of first or primary fasteners such as bolts T1 ("primary bolts T1") extend through the beam web BW and the first leg UB1 of the upper brace UB and are used to connect the first leg UB1 to the beam web BW to capture the insert I1,I2 in the recess BR of its respective beam B1,B2. Fasteners T1 are also used in the same manner to secure the insert I1 to the beam B1.

The neck reinforcement structure RS1 also comprise the plurality of internal cross members XB as noted above. These internal cross members XB are arranged perpendicular or otherwise transverse to the first and second beams B1,B2 and are spaced axially from each other. Each of the internal cross members XB extends between and interconnect the first and second beam inserts I1,I2. At least some of the internal cross members XB are shaped and dimensioned to fit closely between the lower plate LP and the second leg UB2 of the upper brace UB as shown in FIG. 2E. In the illustrated example, the first end of each internal cross member XB is abutted with and connected to the first beam insert I1, and the opposite second end of each internal cross member XB is abutted with and connected to the second beam insert I2. More particularly, a first end of each internal cross member XB is welded to the first leg UB1 of the upper brace UB of the first beam insert I1, and the opposite second end of each internal cross member XB is welded to the first leg UB1 of the upper brace UB of the second beam insert I2. Each internal cross member XB is preferably also fastened at its opposite ends to the first and second inserts I1,I2, respectively, using bolts or other secondary fasteners T2 as shown in FIG. 2E (fasteners T2 are also used in the same manner to secure the cross beam XB to the insert I1. In the illustrated embodiment, at least some of the internal cross members XB are Z bar members that have a z-shaped cross-sectional profile including a first leg XB1, and a second leg XB2 that project in opposite directions from a central vertical support XB3.

Figure 3:
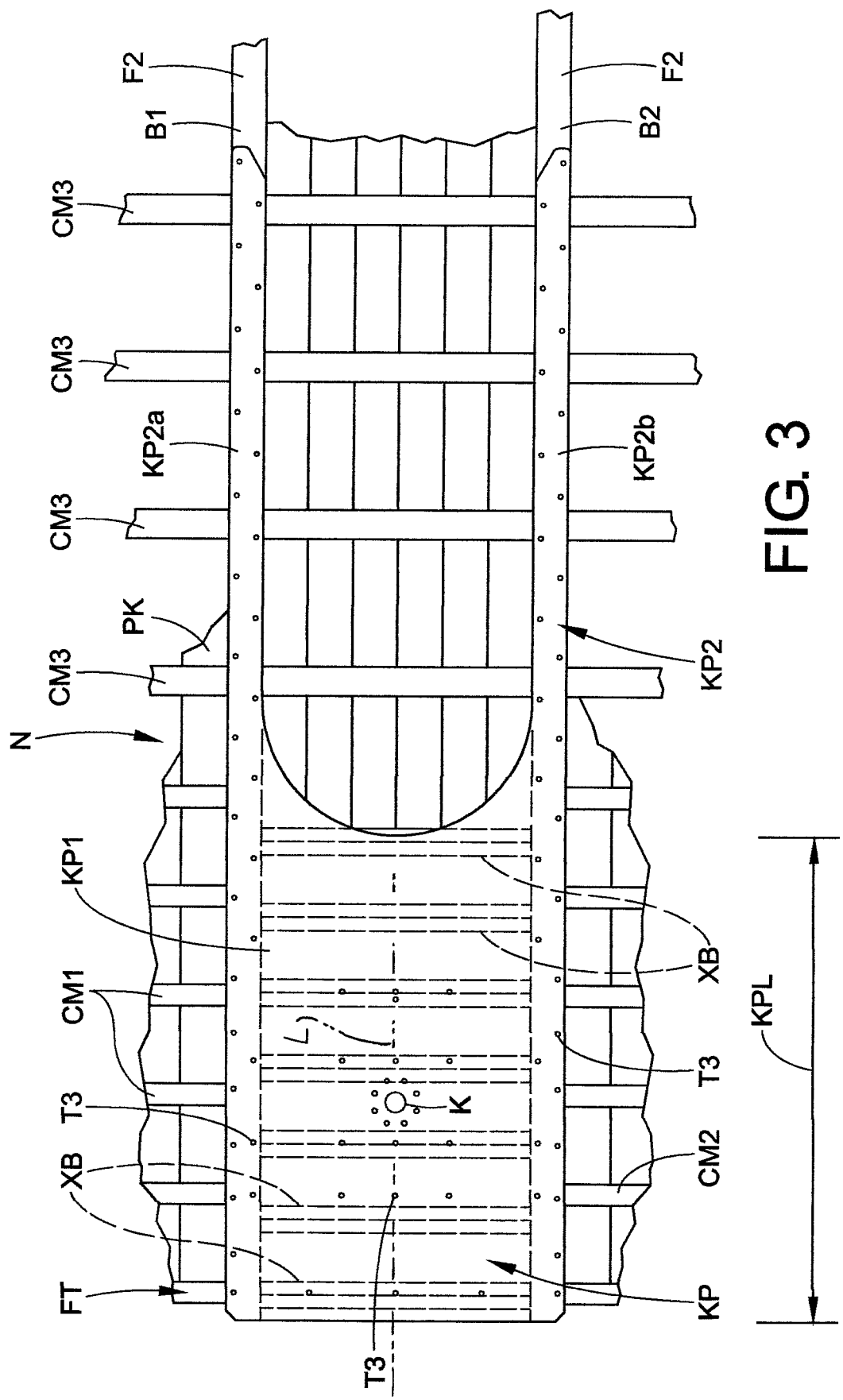
FIG. 3 is a partial bottom view that shows the fifth wheel plate portion of the trailer.

The reinforcement structure RS1 further comprises a specialized fifth-wheel plate KR Referring also to FIG. 3, the fifth wheel plate KP comprises a one-piece plate that is bolted or otherwise fixedly secured beneath the lower flanges F2 of the beams B1,B2 at least in the neck region N. The kingpin K is bolted or otherwise secured to the fifth wheel plate KP. The fifth wheel plate comprises a main portion KP1 that begins adjacent the forward edge of the trailer and that extends rearward beyond the kingpin K. The main portion KP1 extends at least completely between and is connected to both of the beams B1,B2 and is connected to the outer/under side of the beam lower flanges F2. The fifth wheel plate KP further comprises a bifurcated tail portion KP2 including a first tail portion KP2a and a second tail portion KP2b. The first and second tail portions KP2a,KP2b are spaced apart from each other and preferably equal length. The first tail portion KP2a is located adjacent and connected to the outer/under side of the lower flange F2 of the first beam B1, and the second tail portion KP2b is located adjacent and connected to the outer/under side of the lower flange F2 of the second beam B2. The tail portions KP2a, KP2b preferably extend axially rearward beyond the neck portion N to an area where the beams B1,B2 have at least substantially the full height H1. As shown in FIG. 2E, the fifth wheel plate KP is preferably bolted to the beams B1,B2 using fifth wheel plate fasteners T3 that pass through the fifth wheel plate, the lower beam flange F2, and the lower plate LP of the inserts I1,I2 (and optionally also the second leg XB2 of an internal cross member XB). The fasteners T3 comprise heads T3h that are countersunk into the fifth wheel plate KP so as to be flush therewith and not interfere with the fifth wheel of the tractor that is engaged with the kingpin K. As such, the lower flanges F2 of the beams B1,B2 in the neck region N are sandwiched between the fifth wheel plate KP and the lower plates LP of the inserts I1,I2. In the region of the main portion KP1 of the fifth wheel plate that extends between the main beams B1,B2, at least some of the cross beams XB are bolted, welded or otherwise fixedly secured to the main portion KP1 of the fifth wheel plate using the fasteners T3. As shown in FIGS. 2C and 2E, these cross beams XB are manufactured to include a lower tab, flange or other foot structure XB4 that is located adjacent and/or abutted with the fifth wheel plate main portion KP1 and situated between the lower flanges F2 of the main beams B1,B2. This foot portion XB4 is bolted, welded or otherwise fixedly secured to the fifth wheel plate main portion KP1. In one example, the foot portion XB4 is provided as part of the one-piece construction from which the internal cross member XB is defined, in which case the internal cross member XB is notched or otherwise formed so that the foot portion XB4 is positioned as shown between the opposite lower flanges F2 of beams B1,B2 without interfering with the installation of the internal cross member XB (see FIGS. 5 & 6). Alternatively, the foot portion XB4 is provided as a separate component from the remainder of the internal cross member XB, and the foot portion XB4 is fixedly secured to the internal cross member XB by bolts or other fasteners or by welding or otherwise, e.g., by being bolted to the second leg XB2 of the internal cross member XB by the fasteners T3 that also secure the fifth wheel plate KP to the internal cross member XB.

In addition to the reinforcement structure RS1, the neck region N of the trailer T preferably also comprises some conventional cross-members CM as shown in FIGS. 2E & 3. In particular, a plurality of first stub cross-members CM1 extend between the first beam B1 and the left side rail RL, a plurality of second stub cross-members CM2 extend between the second beam B2 and the right side rail RR, and a plurality of third cross-members CM3 (see also FIGS. 2D & 3) extend completely and uninterrupted between and interconnect the left side rail RL and the right side rail RR, while passing through the webs BW of the first and second beams B1,B2 and passing through the first legs UB1 of the upper braces UB of the first and second beam inserts I1,I2.

Figure 4A:
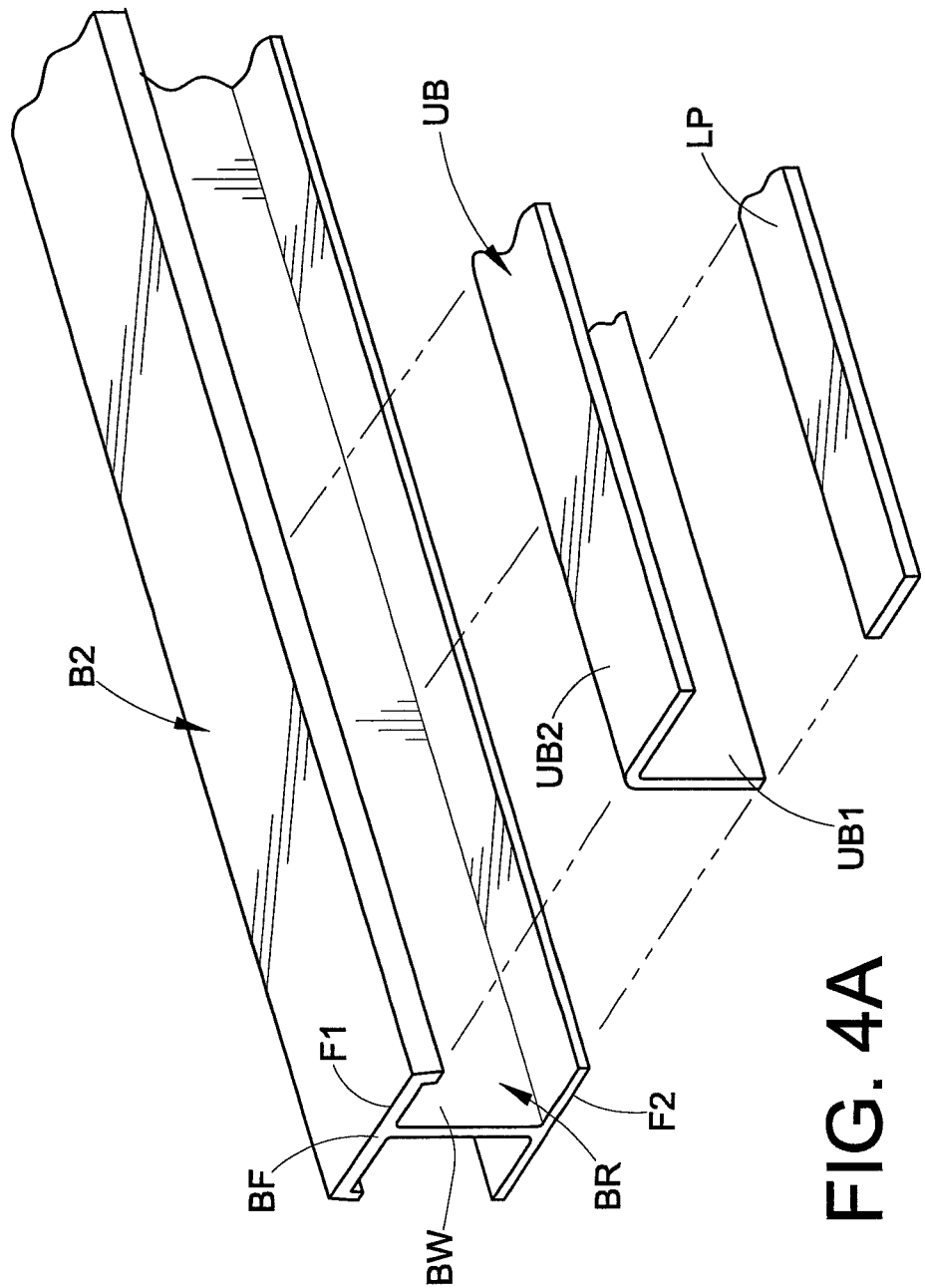

FIGS. 4A-4D illustrate a process for manufacturing a neck N including a reinforcement structure RS1 in accordance with the present development. The process is explained primarily with reference to the beam B2, and those of ordinary skill in the art will recognize that corresponding steps are also performed in relation to the first beam B1. FIG. 4 shows the beam B2 including the beam recess BR in its inner region as defined between the web BW and the upper and lower flanges F1,F2. The lower plate LP and upper brace UB are shown in an exploded view relative to the beam B2. As shown in FIG. 4B, the lower plate LP is fitted into the beam recess BR beginning adjacent beam forward end BF and caused to extend rearward along the lower flange F2 through the neck region N. As noted, the lower plate LP is fitted closely into the lower corner CR of the beam B2 with minimal space between the lower plate LP and the lower corner CR (see FIG. 2E). The upper brace UB is also fitted into the recess BR as shown in FIG. 4B such that its first leg UB1 is abutted and parallel with the beam web BW and such that its second leg UB2 projects horizontally out of the beam recess BR. The upper brace UB extends rearward from the beam forward end BF at least coextensively with the lower plate LP. The weld seam WS is thus defined as described above.

The lower plate LP and upper brace UB are temporarily clamped in the position shown in FIG. 4B (clamps not shown). While these pieces UB,LP are temporarily clamped to the beam B2, a deflection force PS (FIG. 4C) is exerted on the beam B2 to deflect the beam B2 and the lower plate LP and upper brace UB connected thereto sufficiently to deflect the beam B2, the lower plate LP and the upper brace UB. The force PS is applied in the direction indicated by the arrow PS such that the portion of the beam B2 that will be located adjacent the forward end FT of the trailer T is deflected downward, i.e., the deflection force PS is directed from the upper flange F1 toward the lower flange F2 in the vertical plane of the beam web BW. The beam B2 and the components of the insert I2 are deflected by the deflection force PS as shown in broken lines in FIG. 4C. In one preferred embodiment, the beams B1,B2, are provided as prearched beams that are manufactured to include an arch and, in such case, the force PS is oriented in the same direction as the beam arch (down on the forward end FT of the trailer T) so as to tighten the radius of the beam arch for at least the part of the beams B1,B2 where the neck reinforcement structure RS1 is to be installed.

While in the beam B2 is held in this deflected condition as shown by the broken lines of FIG. 4C, the first leg UB1 of the upper brace UB is welded to the lower plate by a continuous weld placed at the weld seam WS, with the weld running the full length of the seam WS, in order to define the second beam insert I2. While the beam B2 is held in its deflected condition (before or after the welding operation at the weld seam WS), the bolts T1 are installed and fully torqued so as to secure the first leg UB1 of the upper brace UB to the beam web BW. The first fasteners T1 are installed to secure the insert I2 in contact with the beam web BW. It can be seen particularly in FIGS. 2E & 4D that the parallel abutted beam web BW and upper brace first leg UB1 combine to define a column structure that strengthens the beam B2. The first fasteners T1 are used to ensure that the upper brace first leg UB1 maintains this parallel abutment with the beam web BW. The weld and surrounding regions of the beam B2 and insert I2 are allowed to cool completely before the force PS is removed from the beam B2. The same processes are completed for the beam B1 to install insert I1.

Figure 4D:
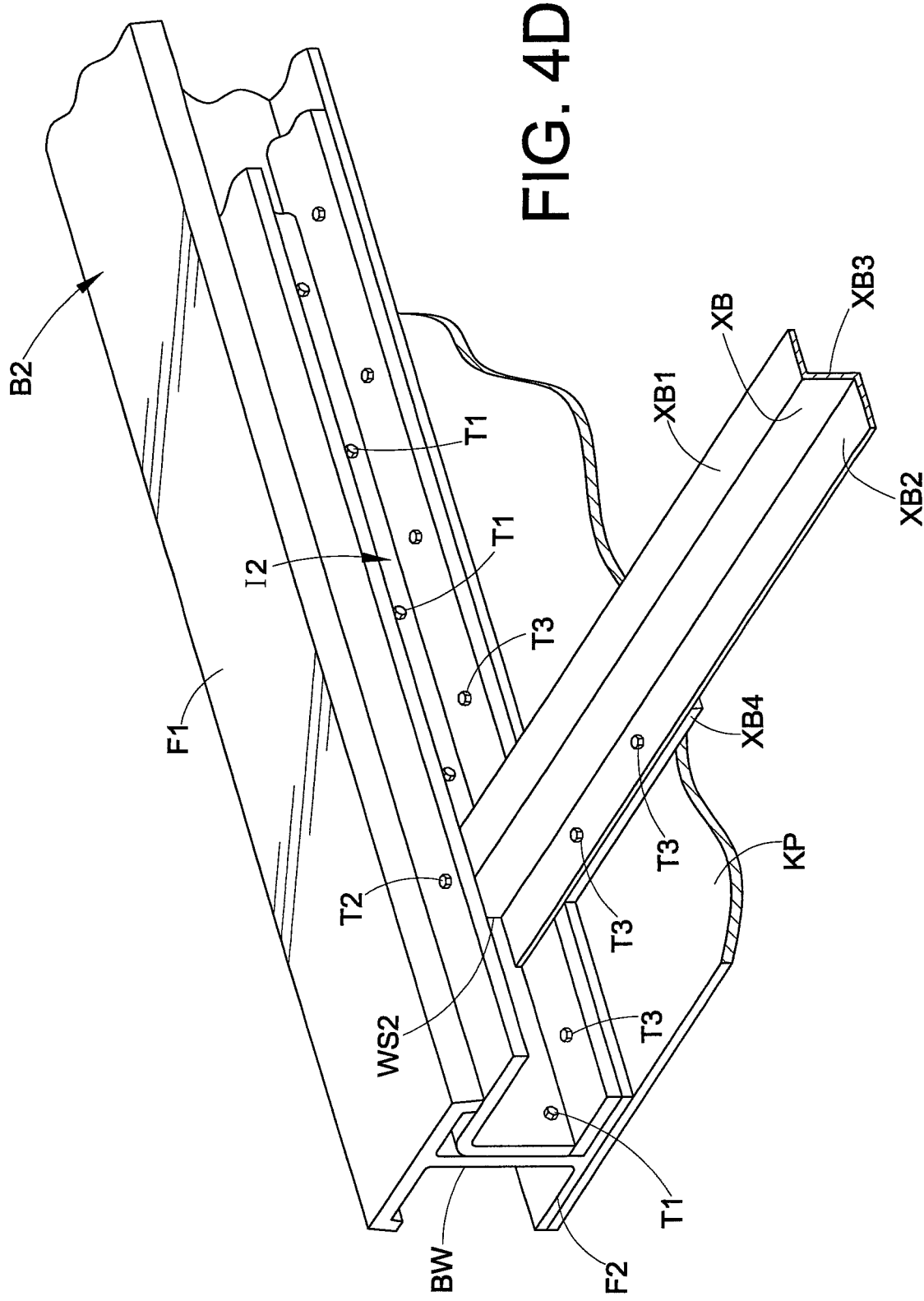

A pair of beams B1,B2, including the their respective beam reinforcement structures or inserts I1,I2 installed as just described, are arranged relative to each other in their operative parallel, spaced-apart positions. Referring now to FIG. 4D (which only shows the beam B2), the process continues with the installation of the multiple internal cross members XB (only one shown) that extend between and interconnect the beams B1,B2, with each internal cross member XB fitted between the lower plate LP and the second leg UB2 of the upper brace UB of each beam B1,B2. A first end of each internal cross member XB is welded to the insert I1 and the opposite second end of each internal cross member XB is welded to the insert I2, at respective seam WS2 where the internal cross member XB abuts the first leg UB1 of the upper brace UB. As noted, the internal cross members XB are preferably Z bar structures that include first (upper) and second (lower) legs XB1,XB2 that project in opposite directions parallel to the lower plate LP and second leg UB2 of the insert I2. The internal cross members XB are preferably dimensioned to fit closely between the lower plate LP and the second leg UB2 of the upper brace UB with minimal clearance, as determined at the point of minimal vertical spacing between the lower plate LP and the upper brace second leg UB2. The second fasteners T2 are also installed to secure the opposite ends of each cross beam XB to the upper brace second legs UB2. As shown, the internal cross members XB are identical to each other, but they can shaped and or sized differently depending upon their location in the neck reinforcement structure RS1.

With continuing reference to FIG. 4D, the fifth wheel plate KP is installed simultaneously to the lower flanges F2 of both beams B1,B2, using the third fasteners T3 that extend through the fifth wheel plate KP and through the lower flange F2. Some of the third fasteners T3 can optionally also extend through the second leg XB2 of a cross beam XB if desired/required. Also, some of the third fasteners T3 are used to secure the cross member feet XB4 to the fifth wheel plate main portion KP1 (or the cross member feet XB4 can be welded to the fifth wheel plate main portion KP1). With reference again to FIG. 2E, it should be noted that the thickness KT of the fifth wheel plate KP needs to be accounted for when determining the height H2 of the beams B1,B2 in the neck region required for a desired height of the platform P in the neck region. In one example, the tractor fifth wheel height is expected to be 46 inches above the road or other support surface when engaged with the kingpin K. If the desired final ride height RH (FIG. 1B) of the platform P at the kingpin K is 54 inches, the combined beam height H2 and the fifth wheel plate thickness must equal 8 inches. If the thickness KT of the fifth wheel plate is ¼ inch (0.25 inches), then H2+0.25=8 inches, which leads to a solution that the second beam height H2=7.75 inches.

FIG. 3 shows an example of a fifth wheel plate KP used in the present embodiment. The fifth wheel plate KP comprises a one-piece steel (e.g., 1050 steel, ¼ inch), stainless steel (e.g., 304 stainless, ¼ inch), or aluminum alloy plate (e.g., ½ inch) that is bolted or otherwise fixedly secured beneath the lower flanges F2 of the beams B1,B2 at least in the neck region N. The kingpin K is bolted or otherwise secured to the fifth wheel plate KP. The fifth wheel plate KP comprises a main portion KP1 that begins adjacent the forward ends BF of the beams B1,B2 and that extends rearward beyond the kingpin K. The main portion KP1 extends at least completely between and is connected to both of the beams B1,B2 and is connected to the outer/under side of the beam lower flanges F2. The fifth wheel plate KP further comprises a bifurcated tail portion KP2 including a first tail portion KP2a and a second tail portion KP2b. The first and second tail portions KP2a,KP2b are spaced apart from each other and preferably equal length. The first tail portion KP2a is located adjacent and connected to the outer/under side of the lower flange F2 of the first beam B1, and the second tail portion KP2b is located adjacent and connected to the outer/under side of the lower flange F2 of the second beam B2. The tail portions KP2a,KP2b preferably extend axially rearward beyond the neck portion N to an area where the beams have at least substantially the full height H1, but they can extend axially rearward a shorter distance in some embodiments. Also, the minimum axially length KPL of the fifth wheel plate main portion KP1 (which is measured at the trailer center line midway between the beams B1,B2 in the illustrated embodiment) can be varied, with a longer main portion KP1 increasing the strength and rigidity of the trailer neck N. The fifth wheel plate KP is preferably bolted to the beams B1,B2 using fasteners T3 that pass through the fifth wheel plate KP, the lower beam flange F2, and the lower plate LP, and optionally also through part of an internal cross member XB depending upon the shape & location of the internal cross member XB. The fasteners T3 comprise heads T3h that are countersunk into the fifth wheel plate KP so as to be flush therewith and not interfere with the fifth wheel of the tractor that is engaged with the kingpin K. The lower flanges F2 of the beams B1,B2 are sandwiched between the fifth wheel plate KP and the lower plates LP. In the region of the main portion KP1 of the fifth wheel plate that extends between the main beams B1,B2, the foot portion/structure XB4 of such internal cross members XB are bolted, welded or otherwise fixedly secured to the main portion KP1 of the fifth wheel plate using additional bolts T3.

The fifth wheel plate KP includes a plurality of countersink bores that receive the third fasteners T3 as described. In one embodiment, these bores are plasma cut, but other methods can be used. It is preferred that the fifth wheel plate be installed on the beams B1,B2 as described below in more detail in relation to FIGS. 8A & 8B. In particular, only a forward end of the fifth wheel plate KP is secured in its operative position to both the first and second beams B1,B2 adjacent their forward ends BF using some of the third fasteners T3, clamps, or other means (the bores KB of the fifth wheel plate KP have previously been formed). The beams B1,B2 including the internal cross members XB extending therebetween, are then (or before) subjected to a deflection force PS as described above in relation to FIGS. 4A-4D to urge the forward ends of the beams B1,B2 in the direction of increasing the arch of the prearched beams B1,B2, i.e., to tighten the radius or curve of the arch of the prearched beams B1,B2. Thus, in the case where the trailer platform P is facing upward, the beams B1,B2 are urged downward at the forward end FT of the trailer. The deflection force is applied in the direction indicated by the arrow PS such that the portion of the beams B1,B2 that will be located at the forward end FT of the trailer T are deflected downward (both beams B1,B2 simultaneously and uniformly), i.e., the deflection force PS is directed from the upper flange F1 toward the lower flange F2 in the vertical plane of each beam web BW. The beams B1,B2 are deflected by the force PS as shown in broken lines in FIG. 8A. In one preferred embodiment, the beams B1,B2, are provided as prearched beams that are manufactured to include an arch and, in such case, the force PS is oriented in the same direction as the beam arch (down on the forward end FT of the trailer T) so as to tighten the radius of the beam arch for at least the part of the beams B1,B2 where the neck reinforcement structure RS1 is to be installed. While this deflection force PS is applied and maintained, installation of the fifth wheel plate KP is completed by forcing the fifth wheel plate KP adjacent and into abutment with the lower flanges F2 of the beams B1,B2 such that the fifth wheel plate KP conforms to the contour of the lower flanges F2, and the previously formed bores KB of the fifth wheel plate KP are used as drill guides for drilling registered bores through the beam lower flanges F2 and through the lower plates LP. The fifth wheel bores KB are also used as guides for drilling registered bores in the cross beam feet XB4. With the deflection force PS still present, the third fasteners T3 are installed and completely torqued in position. The deflection force PS is removed only after the third fasteners T3 are installed and fully torqued and fifth wheel plate is fully installed in its operative position. As such, the neck reinforcement structure RS1 is an assembly at least partially held in its deflected state by the fifth wheel plate KP.

As noted, the trailer beams B1,B2, the conventional cross members CM, the left and right side rails RL,RR, and at least some of the trailer platform members PK are defined from aluminum alloy, typically as extrusions of 6061-T6 or similar. The components of the neck reinforcement structure RS1 are preferably defined from steel, most preferably stainless steel such as "304 stainless steel." It is contemplated that some or all of the components of the neck reinforcement structure RS1 are alternatively defined from aluminum alloy or another metal. The use of stainless steel is preferred over other non/low corrosive metals to eliminate or at least reduce galvanic corrosion due to the use of dissimilar metals. Furthermore, direct contact between the stainless steel and aluminum components can be prevented with a polymeric or other non-metallic/non-conductive spacing member located between the stainless steel and aluminum components, e.g., between the upper brace UB and the beam B1,B2, between the lower plate LP and the beam B1,B2, and between the fifth wheel plate KP and the beams B1,B2.

The use of type 304 stainless steel or other stainless steel provides the required strength and corrosion resistance to ensure that the neck reinforcement structure RS1 compensates for the reduced beam height H2 in the neck region N. In one embodiment, the lower plate LP is provided as a ⅜ inch thick plate of 304 stainless or other stainless steel, the upper brace UB is provided as a 5/16 inch thick one-piece construction of 304 stainless or other stainless steel, the internal cross members XB are provided as 5/16 inch thick Z bars defined from 304 stainless or other stainless steel, the fifth wheel plate is provide as a ¼ inch thick sheet of 304 stainless or other stainless steel, and the first, second, and third fastener bolts T1,T2,T3 are all defined from stainless steel or can be conventional Grade 8 bolts. It is not intended that the present development be limited to these particular materials or dimensions for the neck reinforcement structure components LP, UB, KP, XB.

In an alternative embodiment, the stainless steel components of the reinforcement structure RS1 described above are replaced by the same components manufactured from one or more alternative metals. Suitable alternative metals that can be used are carbon steel (e.g., A36 or 1050) or aluminum alloy.

Figure 2F:
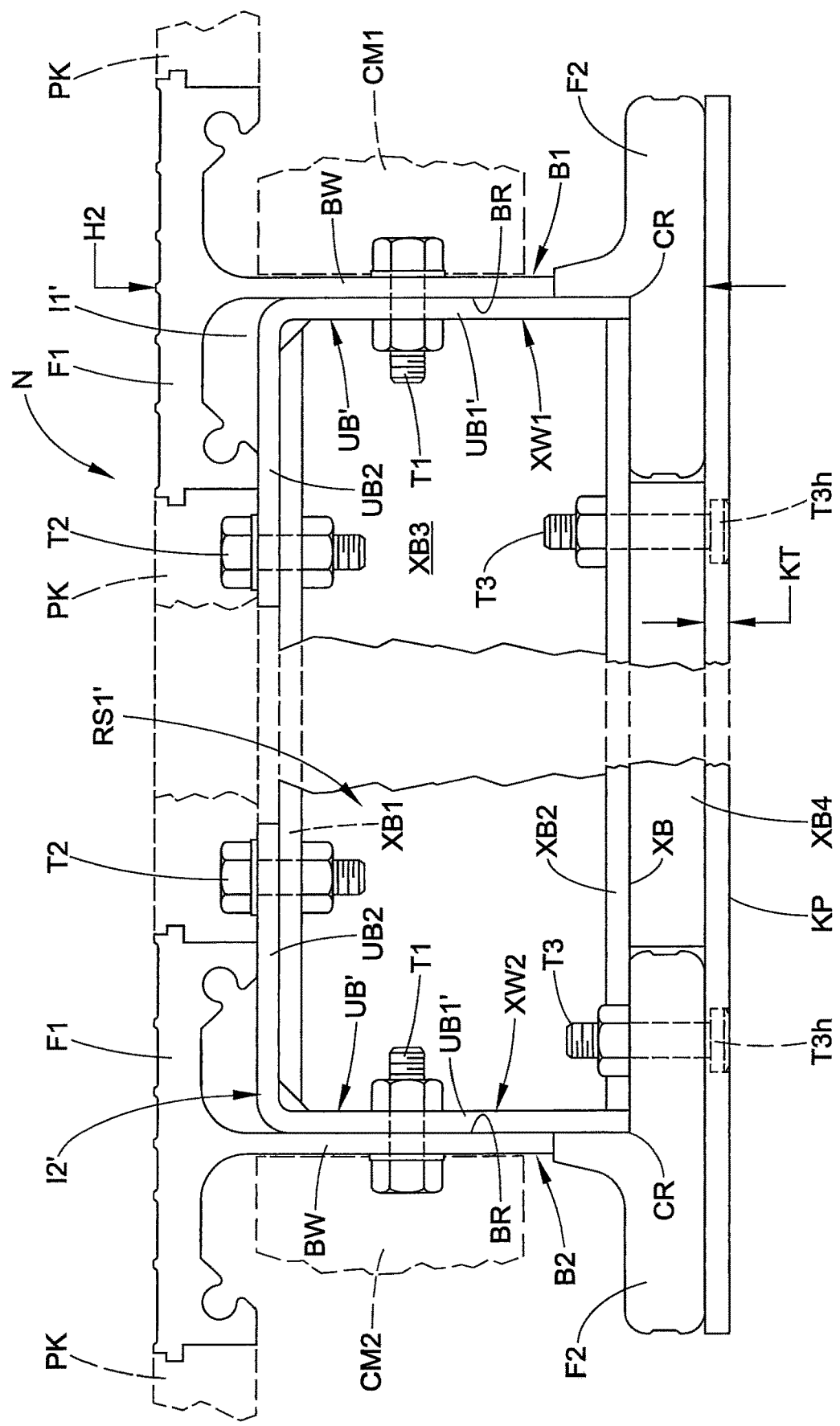
FIG. 2F is similar to FIG. 2E but shows an alternative embodiment of a neck reinforcement structure formed in accordance with the present development.

In another alternative embodiment, portions of the neck reinforcement structure RS1 are omitted entirely to reduce cost and/or weight. As shown in FIG. 2F, a neck reinforcement structure RS1' is illustrated and is identical to the neck reinforcement structure RS1 except as shown and/or described herein. As such, modified components of the neck reinforcement structure RS1' as compared to the neck reinforcement structure RS1 are identified using like reference numbers and letters including a primed (') identifier, otherwise the same reference numbers and letters are used. Each of the first and second beam inserts I1',I2' comprises a brace or upper brace UB' comprising a first leg UB1' that abuts the beam web BW and a second leg UB2' that lies perpendicular to the first leg UB1' and that extends from the first leg UB1' out of the recess BR beyond the beam upper flange F1. The second leg UB2' preferably contacts at least part of the beam upper flange F1 as shown. The upper brace UB' extends longitudinally rearward from a front end located adjacent the front end BF of the beams B1,B2 to a rear end that is located rearward of the neck region N. The upper brace UB' is preferably provided as a one-piece angle member, but the first and second legs UB1',UB2' can be separate from each other, or the upper brace UB' can be fabricated from two or more pieces that are welded together or otherwise connected. In contrast to the neck reinforcement structure RS1 described above and shown in FIG. 2E, in the neck reinforcement structure RS1' of FIG. 2F the lower plate LP is omitted from both the first and second beam reinforcement structures or inserts I1',I2'. For both inserts I1',I2', the first leg UB1' of the upper brace UB' preferably extends from the second leg UB2' into the lower corner CR of the beam B1,B2, and the internal cross members XB are dimensioned to have a vertical height that fits closely between the second leg UB2' of each upper brace UB' and the lower flange F2 of each beam B1,B2 with minimal clearance. As discussed above in relation to the neck reinforcement structure RS1, a plurality of first or primary fasteners such as bolts T1 extend through the beam web BW of each beam B1,B2 and through the first leg UB1' of the upper brace UB' and are used to connect the first leg UB1' of the brace UB' to the beam web BW to capture the insert I1',I2' in the recess BR of its respective beam B1,B2. Fasteners T1 are also used in the same manner to secure the insert I1' to the beam B1. Also, similar to the neck reinforcement structure RS1 of FIG. 2E, the internal cross members XB each extend between and interconnect the first and second beam inserts I1',I2'. At least some of the internal cross members XB are shaped and dimensioned to fit closely between the lower beam flange F2 and the second leg UB2' of the upper brace UB' as shown in FIG. 2F. In the illustrated example, the first end of each internal cross member XB' is abutted with and connected to the first beam insert I1', and the opposite second end of each internal cross member XB is abutted with and connected to the second beam insert I2'. More particularly, a first end of each internal cross member XB is welded to the first leg UB1' of the upper brace UB' of the first beam insert I1' at least in the vertical weld seam or region XW1, and the opposite second end of each internal cross member XB is welded to the first leg UB1' of the upper brace UB' of the second beam insert I2' at least in the vertical weld seam or region XW2. Each internal cross member XB is preferably also fastened at its opposite ends to the first and second inserts I1',I2', respectively, using bolts or other secondary fasteners T2. Fasteners T2 are also used in the same manner to secure the cross beam XB to the insert I1. In the illustrated embodiment, at least some of the internal cross members XB are Z bar members that have a z-shaped cross-sectional profile including a first leg XB1, and a second leg XB2 that project in opposite directions from a central vertical support XB3. The neck reinforcement structure RS1', including the fifth wheel plate KP, is assembled in the same manner as described above for the neck reinforcement structure RS1, except that the lower plates LP are omitted.

In one example, the neck reinforcement structure RS1' or other neck reinforcement structure provided in accordance with the various embodiments disclosed herein is used to provide main beams B1,B2 that define a second height H2 for the beams in the neck region of 5.00 inches. In the example where the thickness KT of the fifth wheel plate KP is 0.25 inches, this would provide an overall height of 5.25 inches (H2+KT=5.25 inches) in the neck region N of the trailer T. For a trailer in which the first height H1≥21, this means that the overall height in the neck region (where "overall height"=H2+KT) is less than or equal to 25% of the first beam height H1. In accordance with all embodiments of the present development, the overall height in the neck region, i.e., H2+KT, is preferably less than or equal to 30% of the first beam height H1, which can be expressed as follows:

$$H2+KT \leq 0.30*H1$$

More preferably, in other embodiments, the overall height in the neck region is less than or equal to 25% of the first beam height H1 as follows:

$$H2+KT \leq 0.25*H1$$

Of course, this necessarily means that the second beam height H2, itself, without including the thickness of the fifth wheel plate KP, is less than 30% of the first beam height H1 (H2<0.30*H1), and the second beam height H2 is also most preferably less than 25% of the first beam height H1 (H2<0.25*H1) to provide a trailer in accordance with the present development.

Figure 5:
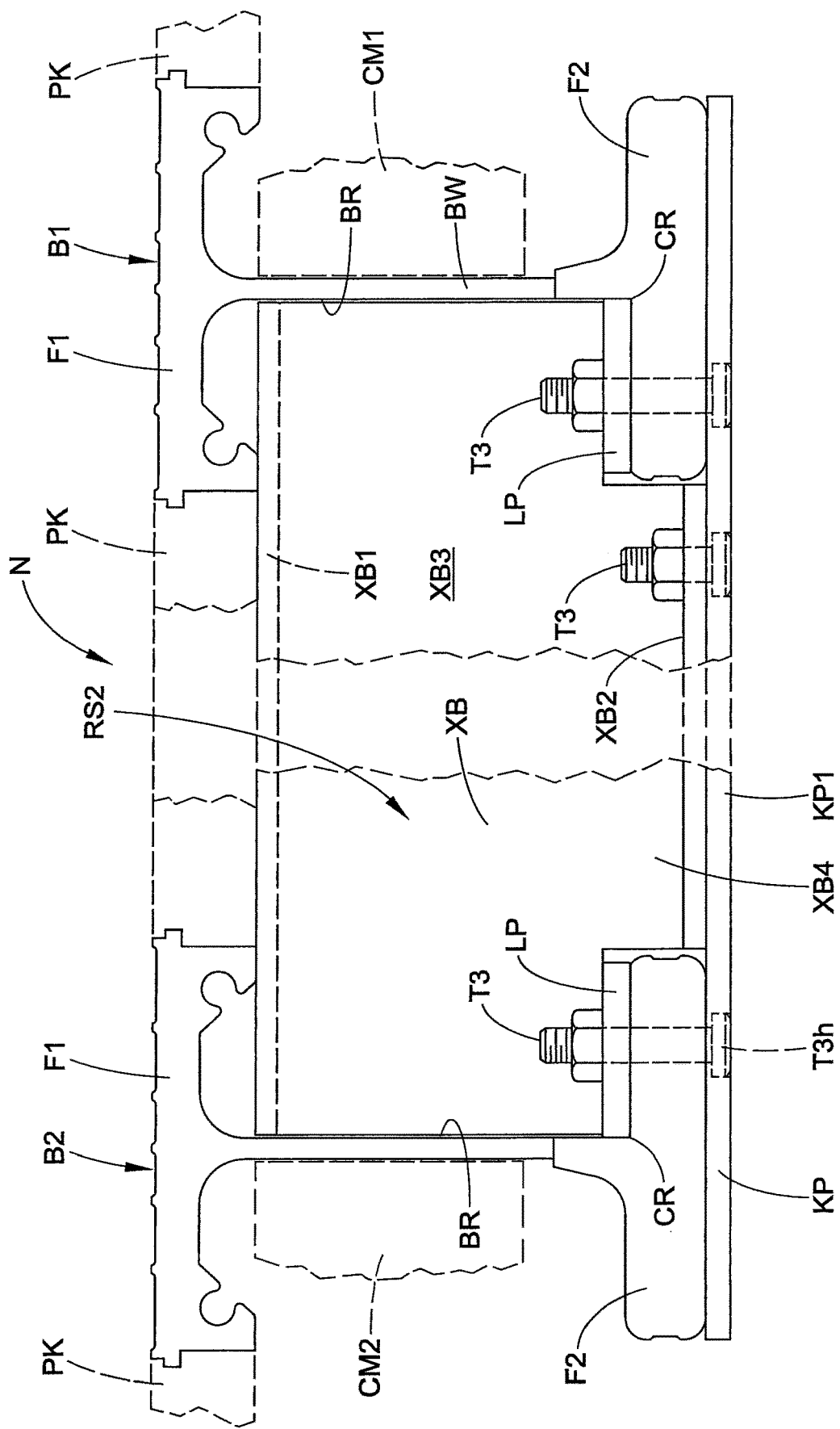
FIG. 5 is similar to FIG. 2E, but illustrates a reinforced trailer neck formed in accordance with an alternative embodiment of the present development.

In another example, in certain applications, the upper brace UB of each insert I1 is omitted to provide a reinforcement structure RS2 as shown in FIG. 5. The reinforcement structure RS2 is identical to reinforcement structure RS1 except as otherwise shown and/or described herein. In such case the internal cross members XB are preferably provided in aluminum with their first and second opposite ends welded directly to the webs BW of the first and second beams B1,B2, and the lower plate LP is secured in position by the third fasteners T3 (if the lower plate LP is defined from aluminum alloy, it can alternatively be welded to the respective beam B1,B2 to which it is connected). In this embodiment, the internal cross members XB are preferably provided as Z bar profiles that are notched as shown to fit closely between the upper and lower flanges F1,F2 of the beams B1,B2 with a foot portion XB4 located between the lower flanges F2 adjacent the fifth wheel plate XP, although other configurations can be used for the cross beams XB.

Figure 6:
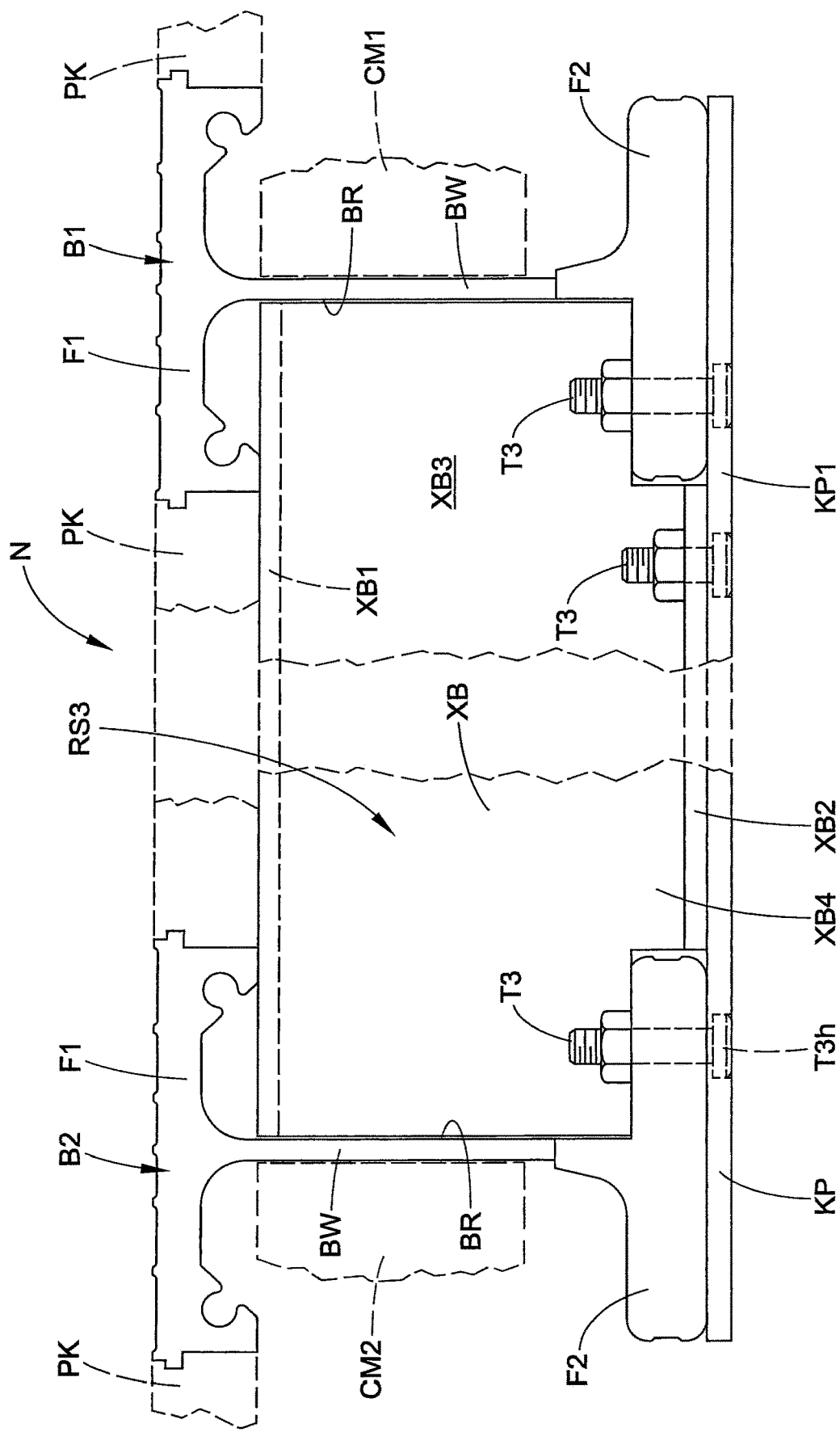
FIG. 6 is also similar to FIG. 2E, but illustrates a reinforced trailer neck formed in accordance with another alternative embodiment of the present development.

In another alternative embodiment, as shown in FIG. 6, both the upper brace UB and the lower plate LP are omitted from the reinforcement structure RS1 to provide a reinforcement structure RS3, i.e., each entire insert I1,I2 is omitted, leaving only the fifth wheel plate KP and the internal cross members XB. Reinforcement structure RS3 is identical to reinforcement structure RS2 except as otherwise shown and/or described herein. In this case, the longitudinally spaced-apart internal cross members XB are preferably provided as aluminum alloy extrusions or other aluminum members that are welded at their opposite first and second ends to the webs BW and/or other portions of the first and second beams B1,B2. The internal cross members XB are preferably provided as Z bar profiles that are notched as shown to fit closely between the upper and lower flanges F1,F2 of the beams B1,B2 with a foot portion XB4 located between the lower flanges F2 adjacent the fifth wheel plate XP, although other configurations can be used for the internal cross members XB.

Figure 7:
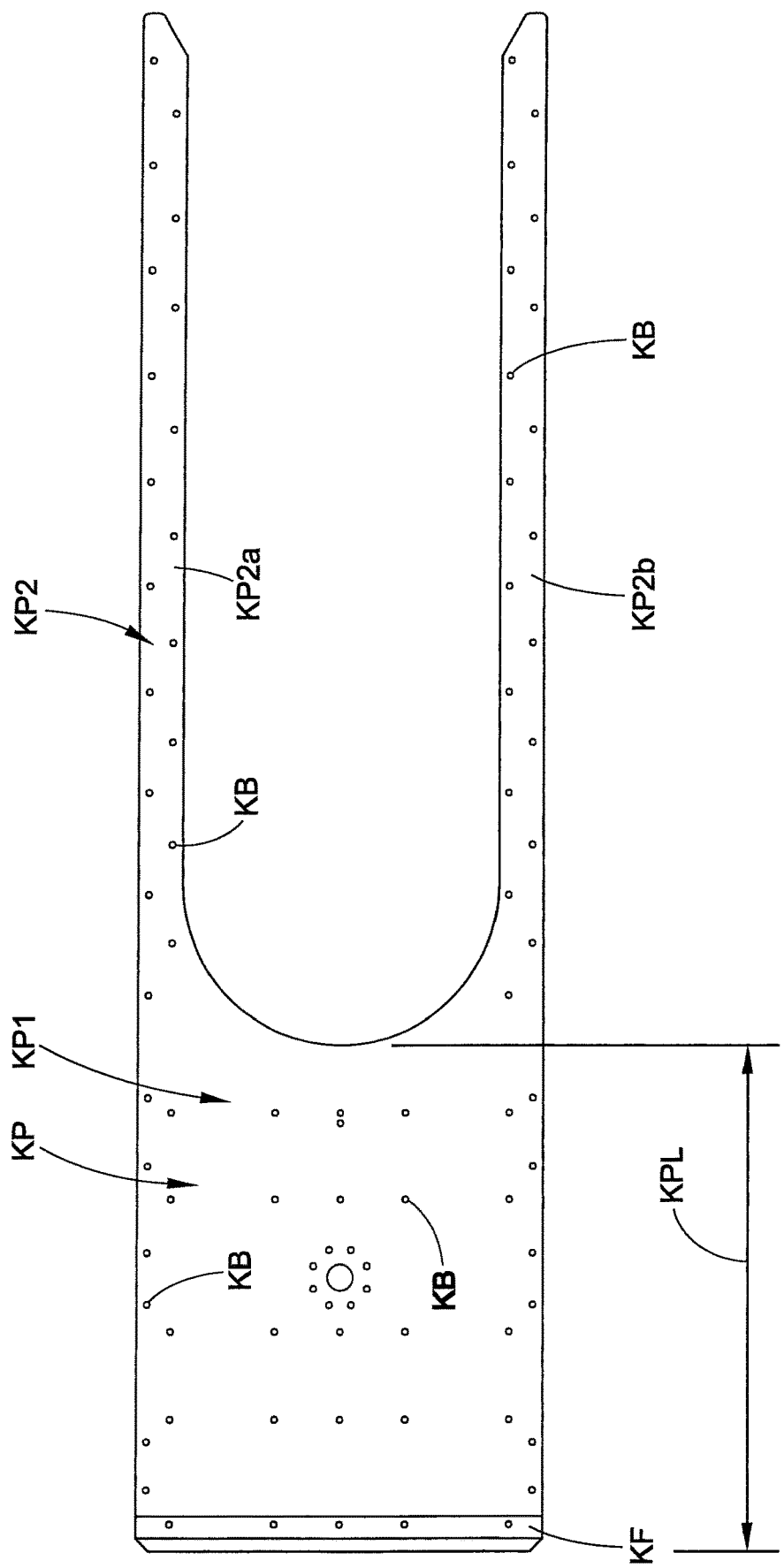
FIG. 7 is a bottom view of a fifth wheel plate used in the embodiments of FIGS. 5 & 6.

FIG. 7 shows an example of a fifth wheel plate KP used in the FIG. 5 and FIG. 6 embodiments. The fifth wheel plate KP comprises a one-piece steel (e.g., 1050 steel, ¼ inch), stainless steel (e.g., 304 stainless, ¼ inch), or aluminum alloy plate (e.g., ½ inch) that is bolted or otherwise fixedly secured beneath the lower flanges F2 of the beams B1,B2 at least in the neck region N. The kingpin K is bolted or otherwise secured to the fifth wheel plate KP. The fifth wheel plate KP comprises a main portion KP1 that begins adjacent the forward edge BF of the beams B1,B2 and that extends rearward beyond the kingpin K. The main portion KP1 extends at least completely between and is connected to both of the beams B1,B2 and is connected to the outer/under side of the beam lower flanges F2. The fifth wheel plate KP further comprises a bifurcated tail portion KP2 including a first tail portion KP2a and a second tail portion KP2b. The first and second tail portions KP2a,KP2b are spaced apart from each other and preferably equal length. The first tail portion KP2a is located adjacent and connected to the outer/under side of the lower flange F2 of the first beam B1, and the second tail portion KP2b is located adjacent and connected to the outer/under side of the lower flange F2 of the second beam B2. The tail portions KP2a,KP2b preferably extend axially rearward beyond the neck portion N to an area where the beams have at least substantially the full height H1. As shown in FIGS. 5 & 6, the fifth wheel plate KP is preferably bolted to the beams B1,B2 using fasteners T3 that pass through the fifth wheel plate, the lower beam flange F2, and the lower plate LP (if the lower plate LP is present as shown in FIG. 5), and optionally also through part of an internal cross member XB depending upon the shape and location of the internal cross member. The fasteners T3 comprise heads T3h that are countersunk into the fifth wheel plate KP so as to be flush therewith and not interfere with the fifth wheel of the tractor that is engaged with the kingpin K. As shown in FIG. 5, the lower flanges F2 of the beams B1,B2 are sandwiched between the fifth wheel plate KP and the lower plates LP (for the embodiment of FIG. 6, the lower plates LP are omitted). In the region of the main portion KP1 of the fifth wheel plate that extends between the main beams B1,B2, the internal cross members XB are bolted, welded or otherwise fixedly secured to the main portion KP1 of the fifth wheel plate. As shown in FIGS. 5 & 6, these internal cross members XB are one piece aluminum extrusions that are cut or notched to fit closely between the beam flanges F1,F2 and to include a lower tab, flange or other foot structure XB4 that is located adjacent and/or abutted with the fifth wheel plate main portion KP1 and situated between the lower flanges F2 of the main beams B1,B2. This foot portion XB4 is bolted (as shown), welded or otherwise fixedly secured to the fifth wheel plate main portion KP1. Alternatively, the foot portion XB4 is provided as a separate component from the remainder of the internal cross member XB, and the foot portion XB4 is fixedly secured to the internal cross member XB by bolts or other fasteners or by welding or otherwise, e.g., by being bolted to the second leg XB2 of the cross member using fasteners T3.

FIG. 7 also shows that the fifth wheel plate KP includes a plurality of countersink bores KB that receive the third fasteners T3 as described. In one embodiment, these bores KB are plasma cut, but other methods can be used. Referring also to FIGS. 8A and 8B, in all embodiments, it is preferred that the fifth wheel plate KP be installed on the beams B1,B2 as part of a deflection operation. In particular, only a forward end KF of the fifth wheel plate KP is secured to the first and second beams B1,B2 adjacent beam forward ends BF as shown in FIG. 8A using some of the third fasteners T3, clamps, or other means (the bores KB of the fifth wheel plate KP have previously been formed). The beams B1,B2 including the internal cross members XB extending therebetween, are then subjected to a deflection force PS as described above in relation to FIGS. 4A-4D to urge the forward ends of the beams B1,B2 in the direction of increasing the arch of the prearched beams B1,B2, i.e., to tighten the radius or curve of the arch of the prearched beams B1,B2. Thus, in the case where the trailer platform P is facing upward, the beams B1,B2 are urged downward at the forward end FT of the trailer. The deflection force is applied in the direction indicated by the arrow PS such that the portion of the beams B1,B2 that will be located at the forward end FT of the trailer T are deflected downward (both beams B1,B2 simultaneously and uniformly), i.e., the deflection force PS is directed from the upper flange F1 toward the lower flange F2 in the vertical plane of each beam web BW. The beams B1,B2 are deflected by the deflection force PS as shown in broken lines in FIG. 8A. In one preferred embodiment, the beams B1,B2 are provided as prearched beams that are manufactured to include an arch and, in such case, the deflection force PS is oriented in the same direction as the beam arch (down on the forward end FT of the trailer T) so as to tighten the radius of the beam arch for at least the part of the beams B1,B2 where the neck reinforcement structure RS1 is to be installed.

While this deflection force PS is applied, installation of the fifth wheel plate KP is completed as indicated by the arrows A1 in FIG. 8B (in FIG. 8B, the broken lines show the unstressed beams B1,B2 while the solid lines show the deflected condition of the beams B1,B2). More particularly, to complete the installation of the fifth wheel plate KP, the fifth wheel plate KP is forced adjacent the lower flanges F2 of the beams B1,B2 as shown in FIG. 8B, and the previously formed bores KB of the fifth wheel plate KP are used as drill guides for drilling registered bores through the beam lower flanges F2 and through the lower plates LP (if the lower plates LP are present as shown in FIG. 5). The fifth wheel bores KB are also used as guides for drilling registered bores in the cross member feet XB4. With the deflection force PS still present, the third fasteners T3 are installed and completely secured in position. The deflection force PS is removed only after the third fasteners T3 are installed and fully torqued or otherwise secured in their operative positions. As such, the neck reinforcement structure RS1,RS2, RS3 is an assembly at least partially held in its deflected state by the fifth wheel plate KR As noted above, this fifth wheel plate installation procedure can also be used when constructing the neck reinforcement structure RS1 of the embodiment shown in FIG. 2E.

The combination of the stainless steel (such as 304 stainless steel) used for the reinforced neck structure RS1, RS2, RS3 with the aluminum alloy (such as 6061-T6) used for the beams B1,B2 has been found to provide an unexpected synergistic effect in terms of the increased strength of the neck reinforcement structure RS1,RS2,RS3 during use of the trailer T. This increased strength is believed to result from the use of dissimilar metals with similar or matched yield strength values, but which exhibit differing physical properties when elastically stressed and elongated. It is believed that the yield strength of the aluminum will be flat or will decrease as it elongates while the yield strength of the 304 stainless steel or other stainless steel will increase during its bending and elongation when stressed such that as the loads on the aluminum beams B1,B2 increase, the stainless steel components of the reinforced neck structure RS1,RS2,RS3 will assume more of these loads and provide the added strength needed to counteract the load stresses and prevent damage to the aluminum beams B1,B2. It is important that the dissimilar metals selected do not result in an ion exchange that causes corrosion when exposed to an electrolyte such as salt water resulting from salt and other compounds used for deicing roads. Accordingly, the use of stainless steel as described is preferred in order to eliminate or at least reduce galvanic corrosion due to the use of dissimilar metals.

Figure 9:
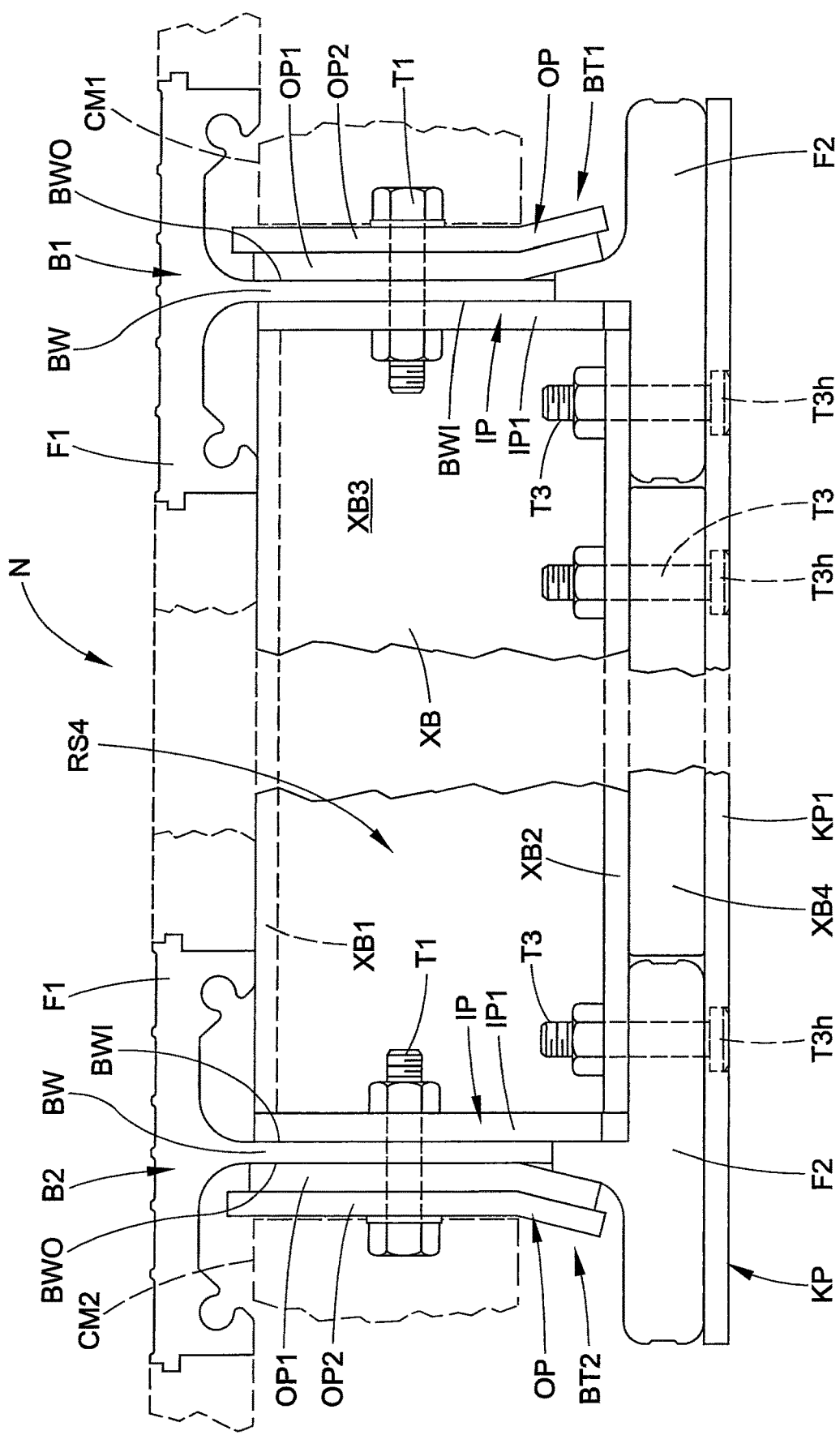
FIG. 9 is a partial section view of a trailer T including a neck reinforcement structure provided in accordance with another alternative embodiment.

A trailer T can alternatively include a reinforced neck N constructed as shown in FIG. 9 at RS4. The reinforcement structure RS4 is constructed the same as the reinforcement structures RS1,RS2,RS3 except as otherwise shown and/or described herein. The reinforced neck N of FIG. 9 comprises a first beam reinforcement structure BT1 connected to the first beam B1, and second beam reinforcement structure BT2 connected to the second beam B2. More particularly, the first and second beam reinforcement structures BT1,BT2 each comprises: (i) a set or stack of one or more longitudinally extending inner reinforcement plates IP located in abutment with the inner region of the respective beam B1,B2 (the inner region of each beam B1,B2 is the portion that faces the other beam B1,B2); and, (ii) a set or stack of one or more outer longitudinally extending reinforcement plates OP located in abutment with an outer region of the respective beam B1,B2 (the outer region of each beam B1,B2 located on the opposite side from the inner region of the beam and faces away from the other beam B1,B2). The set or stack of one or more outer reinforcement plates OP includes at least a first outer plate OP1 arranged parallel to and abutted with an outer face BWO of the vertical web BW of the first beam B1. As shown, set/stack of outer reinforcement plates OP also comprises a second optional outer plate OP2 arranged parallel to and abutted with the first outer plate OP1 on the side opposite the beam web BW, i.e., the second outer plate OP2 is stacked on the first outer plate OP1, and any further outer plates would be stacked in series on top of the second outer plate OP2 in the same manner. As shown, the set or stack of one or more inner reinforcement plates IP includes only a first inner plate IP1 arranged parallel to and abutted with an inner face BWI of the vertical web BW of the first beam B1 but, the set of inner reinforcement plates IP optionally further comprises one or more additional inner plates arranged parallel to and stacked in series on the first inner plate IP1 as described and shown for the outer plates OP1,OP2. For each of the first and second beams B1,B2, a plurality of first fasteners such as bolts T1 are spaced-apart from each other along the longitudinal axis L and extend through the beam web BW and through the inner and outer reinforcement plates IP,OP. The fasteners T1 secure the inner plate IP1 and outer plates OP1,OP2 to the beam web BW such that the beam web BW is sandwiched between the first outer plate OP1 and the first/only inner plate IP1.

Figure 9A:
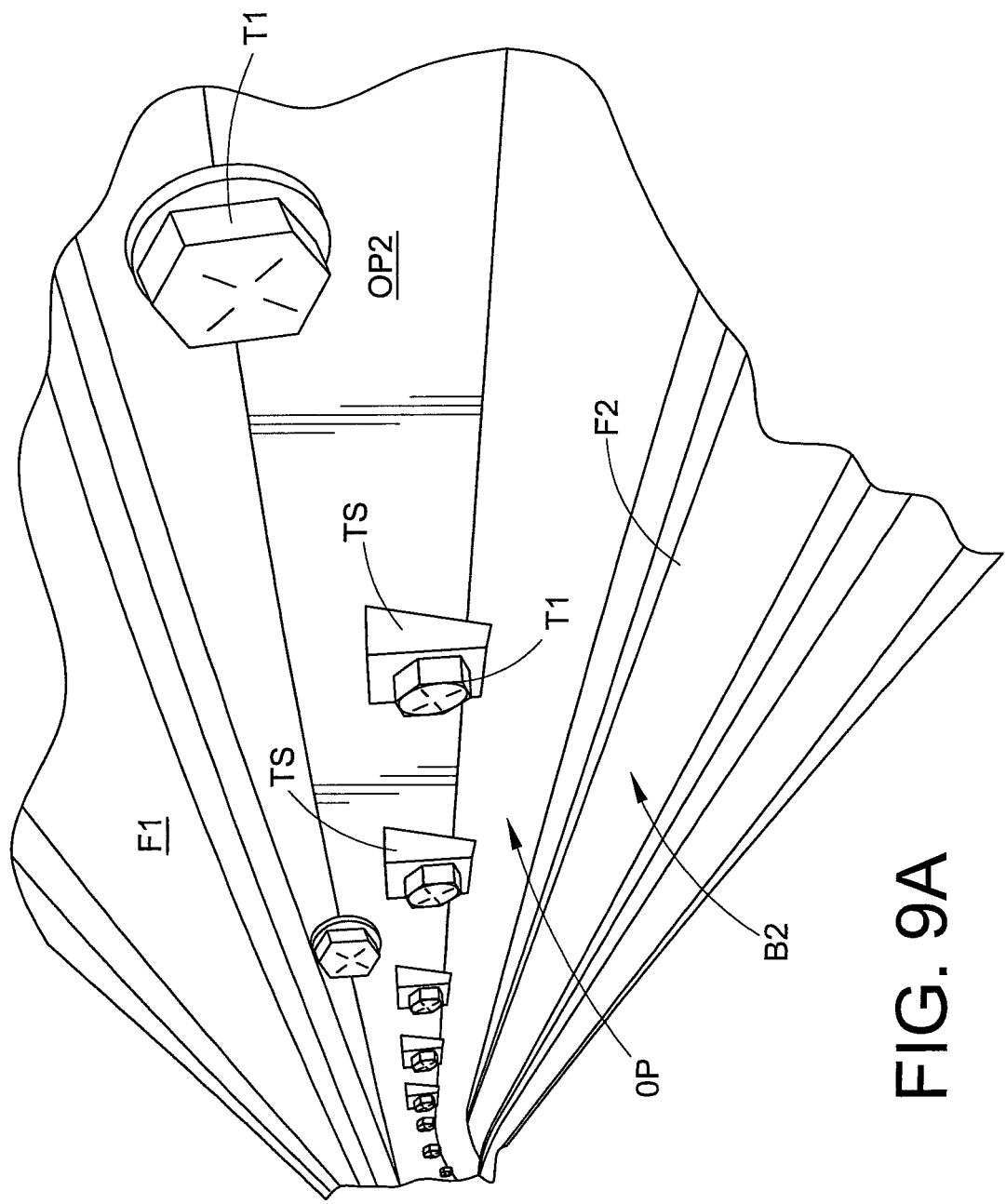

FIGS. 9A and 9B show the second beam B2 and the outer reinforcement plates OP (FIG. 9A) and inner reinforcement plate IP (FIG. 9B), and that also show the first fasteners T1 (the first beam B1 has the same structure as shown for the second beam B2). As shown in FIG. 9A, the fasteners T1 optionally include wedge or other shaped spacers TS that account for any irregular (non-planar) shape to the outermost outer reinforcement plate OP2 (spacers can also be used adjacent the inner plate IP1 if needed). FIG. 9B also shows that the inner and outer reinforcement plates IP,OP begin adjacent a forward end BF of the beam B2 (as shown the outer plates OP are flush with the forward end BF of the beam B2, while the inner plate IP is set back from the forward end BF.

The outer and inner sets of reinforcement plates OP,IP extend axially rearward from adjacent the forward end BF of the beam B1,B2 through the neck region N beyond the kingpin K to a region of the beam B1,B2 that has a beam height H that is greater than the height H2 in the neck region, i.e., each reinforcement plate OP1,OP2,IP1 preferably extends axially rearward to a location where the beam height H is greater than the maximum magnitude of the second height H2 in the neck region N. In one example that is not intended to be limiting, at least the first (or only) inner reinforcement plate IP1 and the first (or only) outer reinforcement plate OP1 each extends axially rearward to a location where the beam B2 has a height H in the range of 8 to 10 inches, but the first/only inner reinforcement plate IP1 and the first/only outer reinforcement plate OP1 can each extend axially rearward to a greater or lesser extent. If present, the second outer plate OP2 extends axially rearward to a lesser extent as compared to the first outer plate OP1 so that the first and second outer plates OP1,OP2 do not terminate at the identical axial location on the beam B1,B2 which could create a stress riser.

Figure 9C:
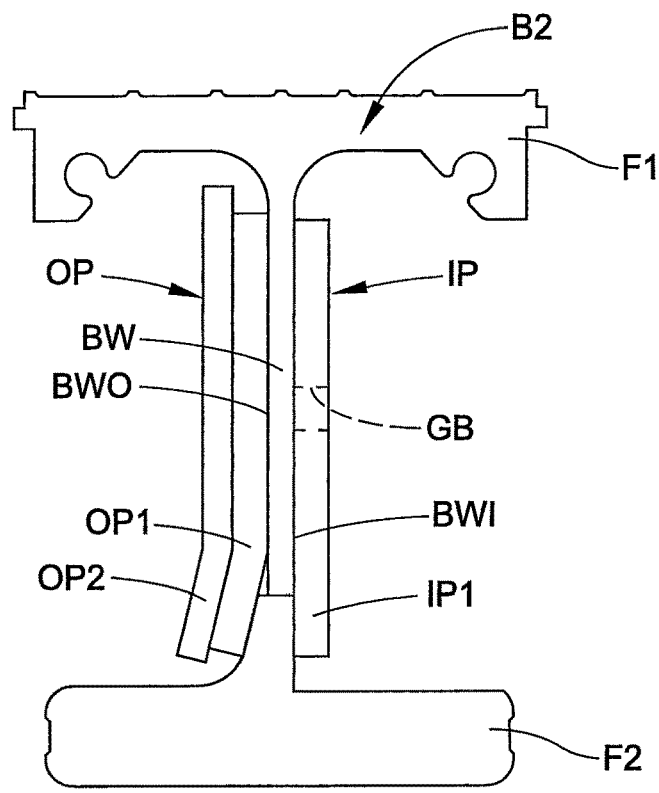
FIGS. 9C and 9D illustrate a process for constructing the beam reinforcement structures shown in FIG. 9.
Figure 9D:
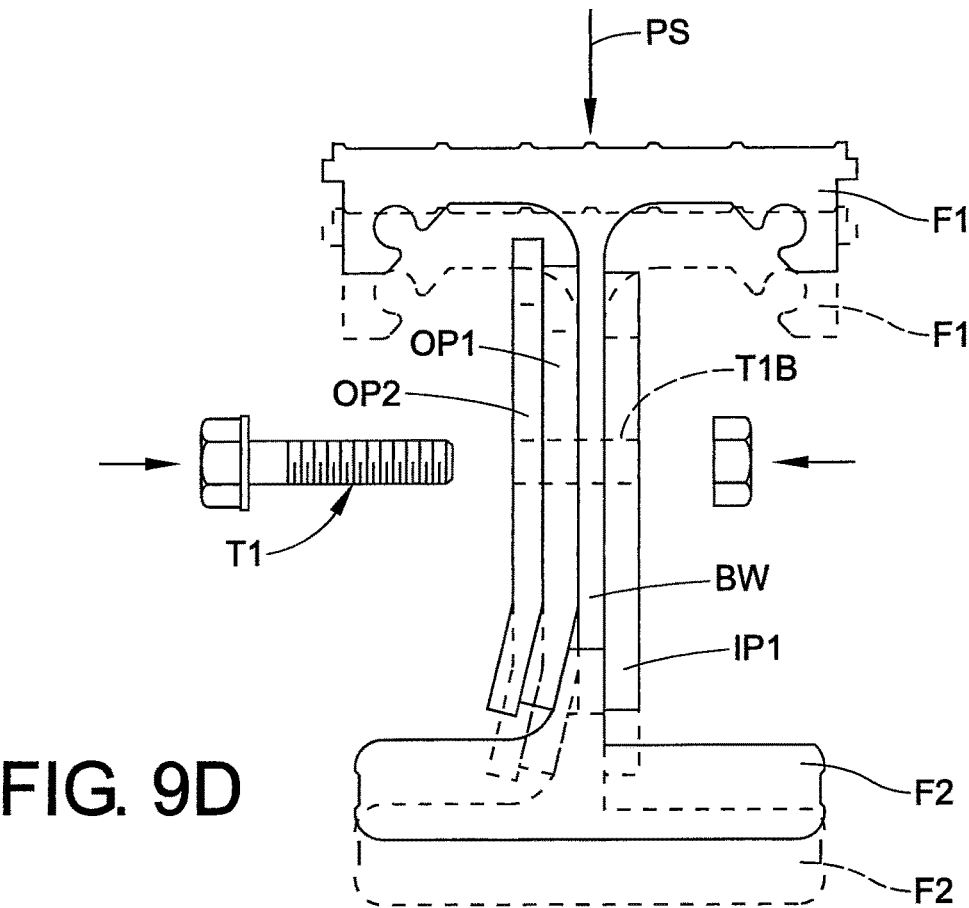

The first and second beam reinforcement structures BT1, BT2 are installed on the respective beams B1,B2 as shown in FIGS. 9C and 9D (the beam B2 and its beam reinforcement structure BT2 are shown, but the process is identical for the beam B1 and its beam reinforcement structure). More particularly, the first and second beam reinforcement structures BT1,BT2 each comprises: (i) a set or stack of one or more longitudinally extending inner reinforcement plates IP located in abutment with the inner region of the respective beam B1,B2 (the inner region of each beam B1,B2 is the portion that faces the other beam B1,B2); and, (ii) a set or stack of one or more longitudinally extending outer reinforcement plates OP located in abutment with an outer region of the respective beam B1,B2 (the outer region of each beam B1,B2 located on the opposite side from the inner region of the beam and faces away from the other beam B1,B2). The set or stack of one or more outer reinforcement plates OP (first and second outer plates OP1,OP2 in the illustrated embodiment) are arranged parallel to the beam web BW with the innermost plate OP1 abutted with an outer face BWO of the web BW, and the set or stack of one or more inner reinforcement plates IP (only the inner plate IP1 in the illustrated embodiment) is arranged parallel to and abutted with the inner face BWI of the web BW of the beam B2, such that the beam web BW is located between or sandwiched between the outer and inner plate sets OP,IP as shown in FIG. 9C. The outer and inner plate sets OP,IP are temporarily clamped to the beam B2 in the position shown in FIG. 9C (clamps not shown). As shown in FIG. 9D, the portion of the beam B2 that is to be located in the neck N of the trailer T (i.e., the portion having a reduced height H2) is subjected to a deflection force PS in the direction shown (from the upper flange F1 toward the lower flange F2) while the portion of the beam B2 that is to be located axially reward of the trailer neck N (the beam portion having the full height H1) is restrained such that the beam B2 is deflected as shown in broken lines (downward in case the beam is oriented upright with the first flange F1 located above the second flange F2). While the beam B2 is held in this deflected state as shown in broken lines, multiple axially spaced-apart fastener bores T1B are drilled or otherwise formed through the outer and inner plate sets OP,IP and the beam web BW (one bore T1B for each bolt T1) and the bolts T1 are installed respectively through the fastener bores T1B and fully torqued. After each bolt T1 is fully installed and torqued, the deflection force PS is removed. In one embodiment, the inner plate IP1 is defined from stainless steel (e.g., 304 stainless) and the outer plates OP1,OP2 are defined from aluminum alloy (e.g., 5086-H34). In such case, it is preferred that the inner plate IP1 include a plurality of preformed guide bores GB located where the fastener bores T1B are to be defined as shown in FIG. 9C. The guide bores GB can be plasma cut or otherwise formed and they serve as a pilot bore or guide for a drill bit or other tool used to form the fastener bores T1B. FIGS. 9E and 9F provide inner and outer side views of the beam B2 after inner and outer plates IP,OP are installed.

Figure 10:
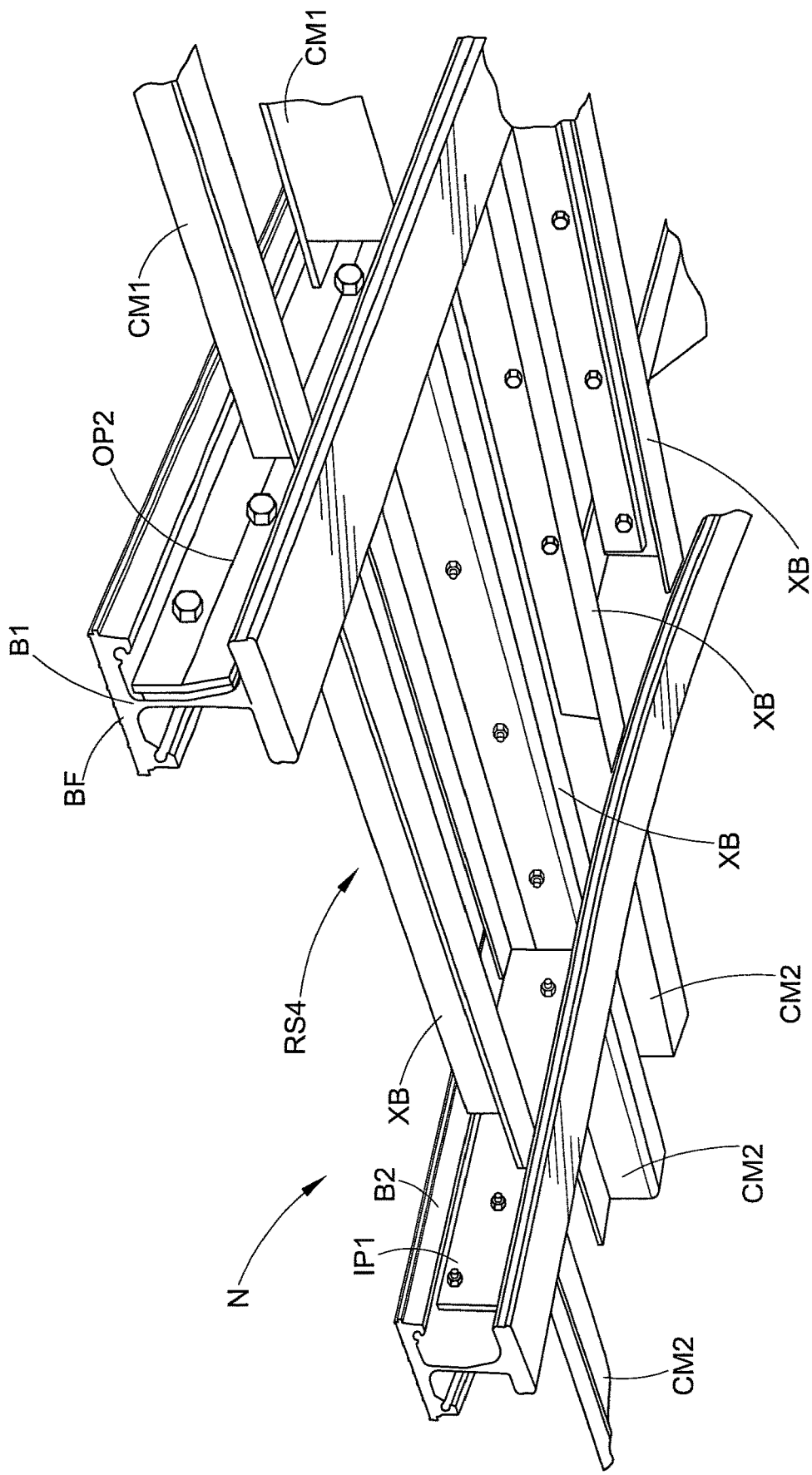
FIG. 10 is a perspective view of a partially assembled trailer including a neck reinforcement structure according to FIG. 9.
Figure 11:
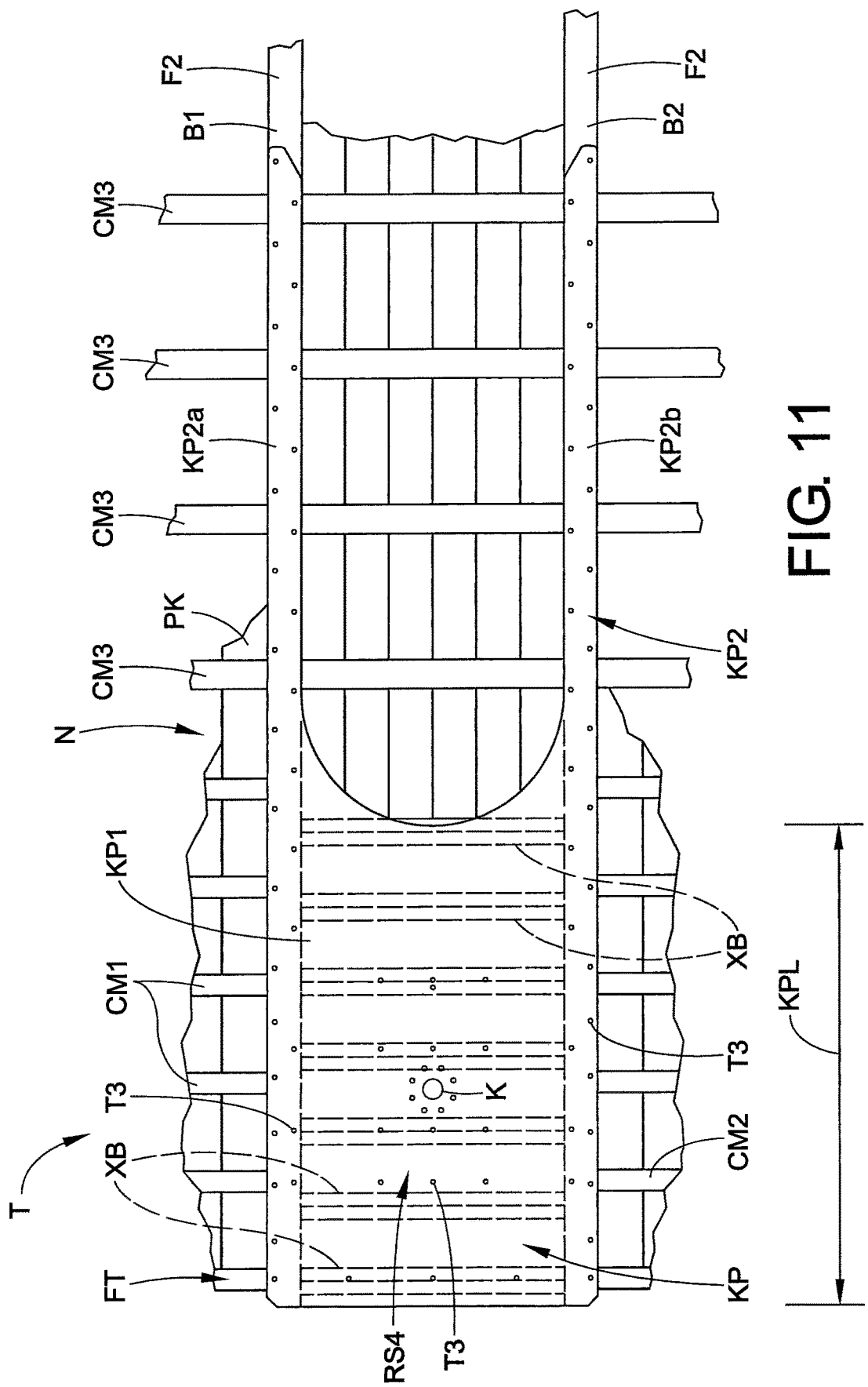
FIG. 11 is a partial bottom view of a trailer including a neck reinforcement structure according to FIG. 9.

With reference also to FIG. 10 and the bottom view of FIG. 11, the neck reinforcement structure RS4 further comprises at least one and preferably a plurality of internal cross members XB that extend between and interconnect the first and second beam reinforcement structures BT1,BT2. As shown, the neck reinforcement structure RS4 comprises a plurality of internal cross members XB that are arranged perpendicular to the trailer longitudinal axis L and parallel and spaced-apart relative to each other along the axis L and that extend between and interconnect the inner plate sets IP of the beams B1,B2. In the illustrated embodiment, at least some of the internal cross members XB are Z bar members that have a z-shaped cross-sectional profile (the z-shaped cross-sectional profile can be seen in FIG. 4D in connection with the neck reinforcement structure RS). Each internal cross member XB includes a first end abutted with and connected to the inner plate(s) IP of the first beam B1 and an opposite second end abutted with and connected to the inner plate(s) IP of the second beam B2. At least some of the internal cross members XB are shaped and dimensioned to fit closely between the lower flange F2 and the upper flange F1 of the beams B1,B2. More particularly, a first end of each internal cross member XB is welded to the inner plate IP1 of the beam reinforcement structure BT1, and the opposite second end of each cross beam XB is welded to the inner plate IP1 of the second beam reinforcement structure BT2. As noted above, in the illustrated embodiment at least some of the internal cross members XB are Z bar members that have a z-shaped cross-sectional profile including a first and second legs XB1,XB2 that project outwardly in opposite directions from a central vertical support XB3 that is oriented perpendicularly or at least transversely relative to the beam flanges F1,F2.

As shown in FIG. 9, FIG. 10, and the bottom view of FIG. 11, the neck reinforcement structure RS4 further comprises a plurality of first stub cross members CM1 that extend between the outer plate set OP of the first beam B1 and the left side rail RL, and a plurality of second stub cross members CM2 that extend between the outer plate set OP of the second beam B2 and the right side rail RR. These first and second stub cross members CM1,CM2 are welded to the outer plate sets OP of the first and second beams B1,B2, respectively, and are welded at their outer ends to the left and right side rails RL,RR, respectively. It can be seen in FIG. 10 that the first and second stub cross members CM1,CM2 are also Z bar members defined with a z-shaped cross section or profile as described above in relation to the internal cross members XB, and the stub cross members CM1,CM2 preferably comprise extruded aluminum members.

FIG. 11 is a bottom view of a trailer T including the neck reinforcement structure RS4. As shown in FIGS. 9 and 11, the reinforcement structure RS4 further comprises a specialized fifth-wheel plate KP (the fifth wheel plate KP itself can be provided in accordance with that shown in FIG. 7 or similar). The fifth wheel plate KP comprises a one-piece metal plate that is bolted or otherwise fixedly secured beneath the lower flanges F2 of the beams B1,B2 at least in the neck region N. The kingpin K is bolted or otherwise secured to the fifth wheel plate KP. The fifth wheel plate comprises a main portion KP1 that begins adjacent the forward edge FT of the trailer T and that extends axially rearward beyond the kingpin K for at least the same distance as the kingpin K is spaced from the forward edge FT of the trailer T. The main portion KP1 extends laterally at least completely between and is connected to both of the beams B1,B2 and is connected to the outer/under side of the beam lower flanges F2. As noted above, as in all other embodiments, the minimum axial length KPL of the main portion KP1 (its length as measured parallel to and, in the present embodiment, midway between the beams B1,B2) can be increased for added strength and rigidity of the trailer T and can be decreased to reduce cost and weight for trailers T where such added strength and rigidity is not required. The fifth wheel plate KP further comprises a bifurcated tail portion KP2 connected to the main portion KP1 and including a first tail portion KP2a and a second tail portion KP2b. The first and second tail portions KP2a,KP2b are spaced apart from each other and preferably equal length. The first tail portion KP2a is located adjacent and connected to the outer/under side of the lower flange F2 of the first beam B1, and the second tail portion KP2b is located adjacent and connected to the outer/under side of the lower flange F2 of the second beam B2. In one embodiment, the tail portions KP2a,KP2b preferably extend axially rearward from the main portion KP1 beyond the neck portion N to an area where the beams B1,B2 have the full height H1 or at least substantially the full height H1. Alternatively, the tail portions KP2a,KP2b extend axially rearward a lesser extent to a location where the beams B1,B2 have less than the full height H1. In another embodiment the tail portions KP2a, KP2b extend axially rearward along the respective lower flanges F2 at least to a location where the beams B1,B2 have a height H that is at least twice the height H2 of the beams B1,B2 in the neck region N, although this distance can also vary. As shown in FIG. 9, the fifth wheel plate KP is preferably bolted to the beams B1,B2 using fasteners T3 that pass through the fifth wheel plate KP and through the lower beam flange F2 (and that optionally also pass through the second leg XB2 of an internal cross member XB). The fasteners T3 comprise heads T3h that are countersunk into the fifth wheel plate KP so as to be flush therewith and not interfere with the fifth wheel of the tractor that is engaged with the kingpin K. In the region of the main portion KP1 of the fifth wheel plate that extends between the main beams B1,B2, at least some of the internal cross members XB are bolted, welded or otherwise fixedly secured to the main portion KP1 of the fifth wheel plate. As shown in FIG. 9, these internal cross members XB are manufactured to include a lower tab, flange or other foot structure XB4 that is located adjacent and/or abutted with the fifth wheel plate main portion KP1 and situated between the lower flanges F2 of the main beams B1,B2, or the foot structure XB4 is a separate member positioned between the fifth wheel plate KP and the second (lower) leg XB2 of the internal cross member XB. This foot portion XB4 is bolted, welded or otherwise fixedly secured to the fifth wheel plate main portion KP1. In one example, the foot portion XB4 is provided as part of the one-piece construction from which the internal cross member XB is defined, in which case the internal cross member XB is notched or otherwise formed so that the foot portion XB4 is positioned laterally between the opposite beam lower flanges F2 as shown without interfering with the installation of the internal cross member XB. Alternatively, as noted, the foot portion XB4 is provided as a separate component from the remainder of the internal cross member XB, and the foot portion XB4 is fixedly secured to the internal cross member XB by bolts or other fasteners or by welding or otherwise, e.g., by being bolted to the second leg XB2 of the internal cross member XB by bolts T3.

As described above, FIG. 10 also shows that a trailer T including the neck reinforcement structure RS4 also comprises conventional cross members CM. A plurality of first stub cross-members CM1 extend between and interconnect the outer plate OP2 of the first beam B1 and the left side rail RL, a plurality of second stub cross-members CM2 extend between and interconnect the outer plate OP2 of the second beam B2 and the right side rail RR, and a plurality of third cross members CM3 (FIG. 11) extend completely and uninterrupted between and interconnect the left side rail RL and the right side rail RR, while passing through the webs BW of the first and second beams B1,B2 (if required, some of the third cross members CM3 also extend through any inner and outer plates IP,OP connected to the beams B1,B2).

Figure 12:
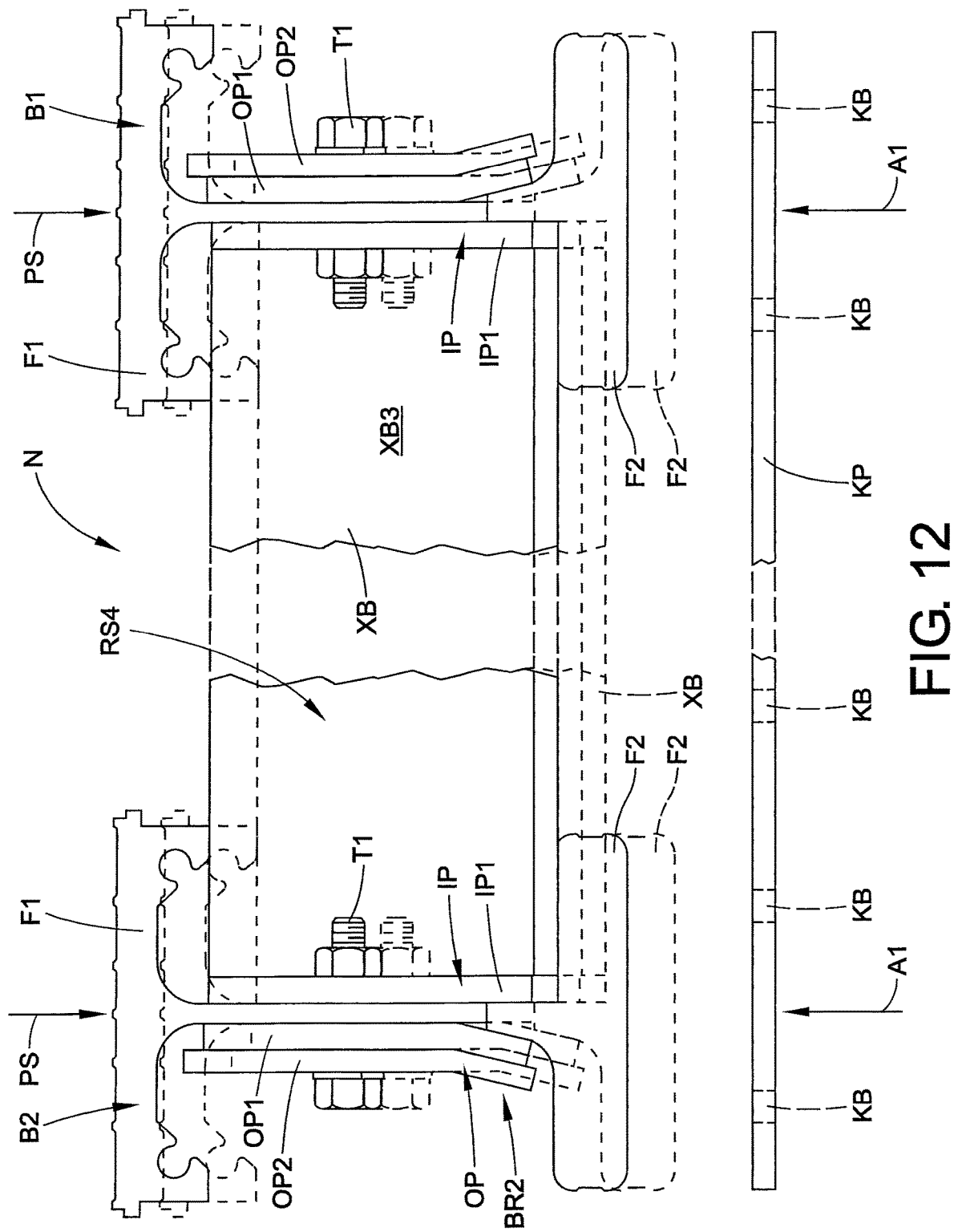
FIG. 12 is a view similar to FIG. 9, but illustrates a process for constructing the neck reinforcement structure.

For the neck reinforcement structure RS4 (as for the neck reinforcement structures RS1,RS2,RS3), it is preferred that the fifth wheel plate KP be installed on the beams B1,B2 as part of a deflection operation as described above in relation to FIGS. 8A and 8B. Referring again to FIGS. 8A and 8B, and also to FIG. 12, during an initial part of this deflection operation, only a forward end KF of the fifth wheel plate KP is secured in it operative position adjacent the forward end BF of the first and second beams B1,B2 as shown in FIG. 8A using some of the third fasteners T3, clamps, or other means. The beams B1,B2 including the internal cross members XB fully installed and extending there between, are both then subjected to a simultaneous and uniform deflection force PS to urge the forward ends of the beams B1,B2 in the direction of increasing the arch of the prearched beams B1,B2, i.e., to tighten the radius or curve of the arch of the prearched beams B1,B2. Thus, in the case where the beam flange F1 is positioned above the beam flange F2 for the respective beams B1,B2 (such as when the trailer platform P would be facing upward) the beams B1,B2 are urged downward at the forward end FT of the trailer while the beams B1,B2 are restrained from movement axially rearward from the neck region N, i.e., the portions of the beams B1,B2 that have the full height H1 are restrained while the portions of the beams B1,B2 having the reduced height H2 are subjected to the deflection force PS. The deflection force is applied in the direction indicated by the arrows PS such that the portion of the beams B1,B2 that will be located at the forward end FT of the trailer Tare deflected downward (both beams B1,B2 simultaneously and uniformly), i.e., the deflection force PS is directed from the upper flange F1 toward the lower flange F2 in the vertical plane of each beam web BW. The beams B1,B2 are deflected by the force PS as shown in broken lines in FIG. 8A and FIG. 12. In one preferred embodiment, the beams B1,B2, are provided as prearched beams that are manufactured to include an arch and, in such case, the deflection force PS is oriented in the same direction as the beam arch (down on the forward end FT of the trailer T) so as to tighten the radius of the beam arch for at least the part of the beams B1,B2 where the neck reinforcement structure RS1 is to be installed.

While this deflection force PS is applied and maintained, installation of the fifth wheel plate KP is completed as indicated by the arrows A1 in FIG. 8B (in FIG. 8B, the broken lines show the unstressed beams B1,B2 while the solid lines show the deflected condition of the beams B1,B2). It should be noted that the forward end KF of the fifth wheel plate KP can be secured to the beams B1,B2 before or after the deflection force PS is initiated. To complete the installation of the fifth wheel plate KP, the fifth wheel plate KP is forced adjacent the lower flanges F2 of the beams B1,B2 as shown in FIG. 8B, and the previously formed bores KB of the fifth wheel plate KP are used as drill guides for drilling registered bores through the beam lower flanges F2 (or fifth wheel plate bores KB can be drilled at the same time that bores are drilled in the lower flanges F2). The pre-formed fifth wheel bores KB are also used as guides for drilling registered bores in the cross member feet XB4 in the case where the cross member feet XB4 are aligned with a row of the fifth wheel bores. With the deflection force PS still present, the third fasteners T3 are installed and completely torqued in their operative positions to complete the installation of the fifth wheel plate KP. The deflection force PS is removed only after the third fasteners T3 are installed and fully torqued. As such, the neck reinforcement structure RS4 is an assembly at least partially held in its deflected state by the fifth wheel plate KP.

In one embodiment of the neck reinforcement structure RS4, the outer plates OP1,OP2 are defined from aluminum alloy such as 5086-H34 sheet material, the inner plate IP1 is defined from stainless steel, such as 304 stainless, and the internal cross members XB and feet XB4 are defined from 304 stainless, which allows the internal cross members XB to be welded at their opposite ends to the internal plates IP1. The fifth wheel plate KP is defined from 304 stainless or carbon steel or other metal. The bolts T1,T3 can be conventional Grade 8 bolts. The conventional cross members CM, including the first and second stub cross members CM1,CM2 are defined from aluminum alloy which facilitates the welding of the these cross members CM,CM1,CM2 to the aluminum left and right side rails RL,RR and to the aluminum second outer plate OP2.

The combination of the stainless steel (such as 304 stainless steel) used for the inner plate IP1 and internal cross members XP of reinforced neck structure RS4 with the aluminum alloy (such as 6061-T6) used for the beams B1,B2 and the aluminum plates OP1,OP2 has been found to provide an unexpected synergistic effect in terms of the increased strength of the neck reinforcement structure RS4 during use of the trailer T. This increased strength is believed to result from the use of dissimilar metals with similar or matched yield strength values, but which exhibit differing physical properties when elastically stressed. It is important to minimize ion exchange between the dissimilar metals that can cause corrosion when exposed to an electrolyte such as salt water resulting from salt and other compounds used for deicing roads. Accordingly, the use of stainless steel as described is preferred over carbon steel in order to eliminate or at least reduce galvanic corrosion due to the use of dissimilar metals. In addition, polymeric film, paint, and/or other coatings are installed or applied at the interface between the dissimilar metals to inhibit ion exchange and the associated corrosion. One suitable coating is ECK brand corrosion inhibitor available commercially from Van Nay, LLC, South Elgin, Ill. and described in U.S. Pat. No. 5,744,197.

As in the above embodiments, a trailer T including the neck reinforcement structure RS4 is preferably constructed with a beam height H2 in the neck region N (as measured at the kingpin K) of 10 inches or preferably less. For example, H2=6 inches or less, or H2=5 inches or less, or H2=4 inches or less (e.g., 3.75 inches), but it is not intended that the present development be limited to these dimensions.

Figure 13:
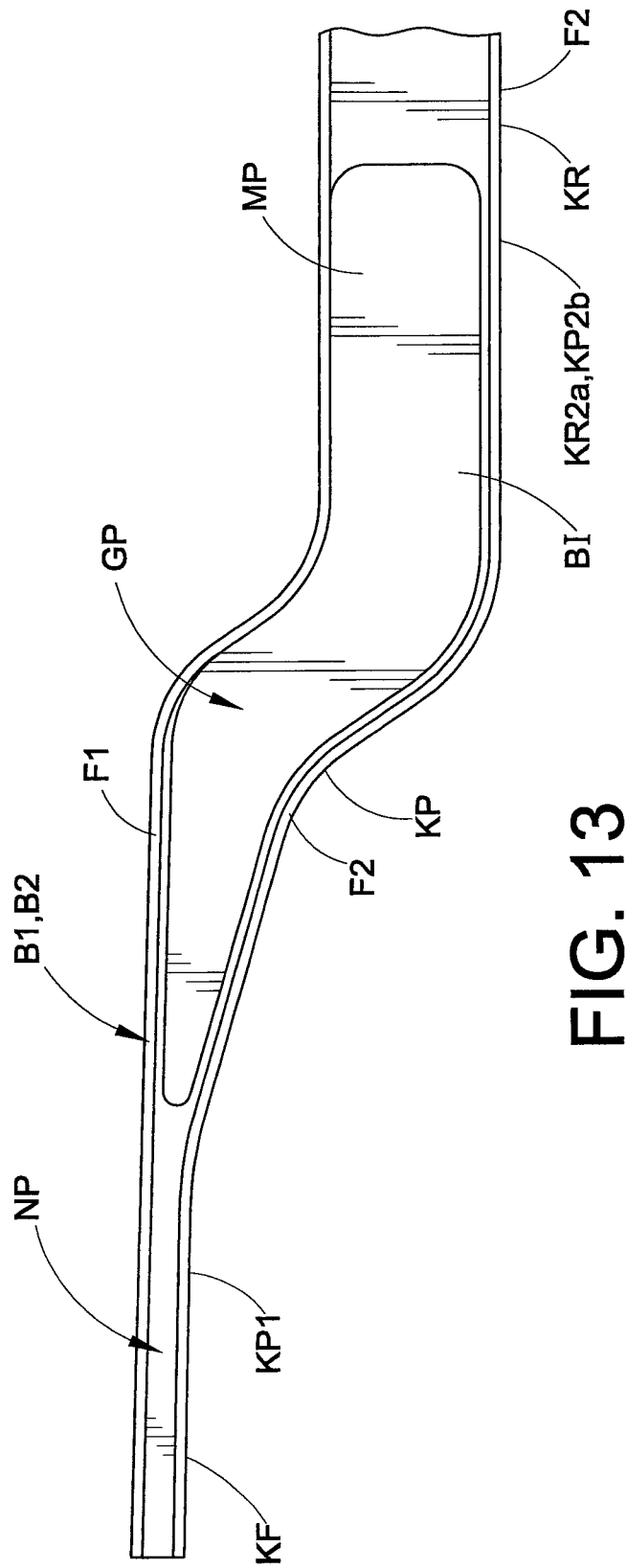
FIG. 13 illustrates a drop deck beam that can be used to construct a trailer including the neck reinforcement structure of FIG. 9.
Figure 14:
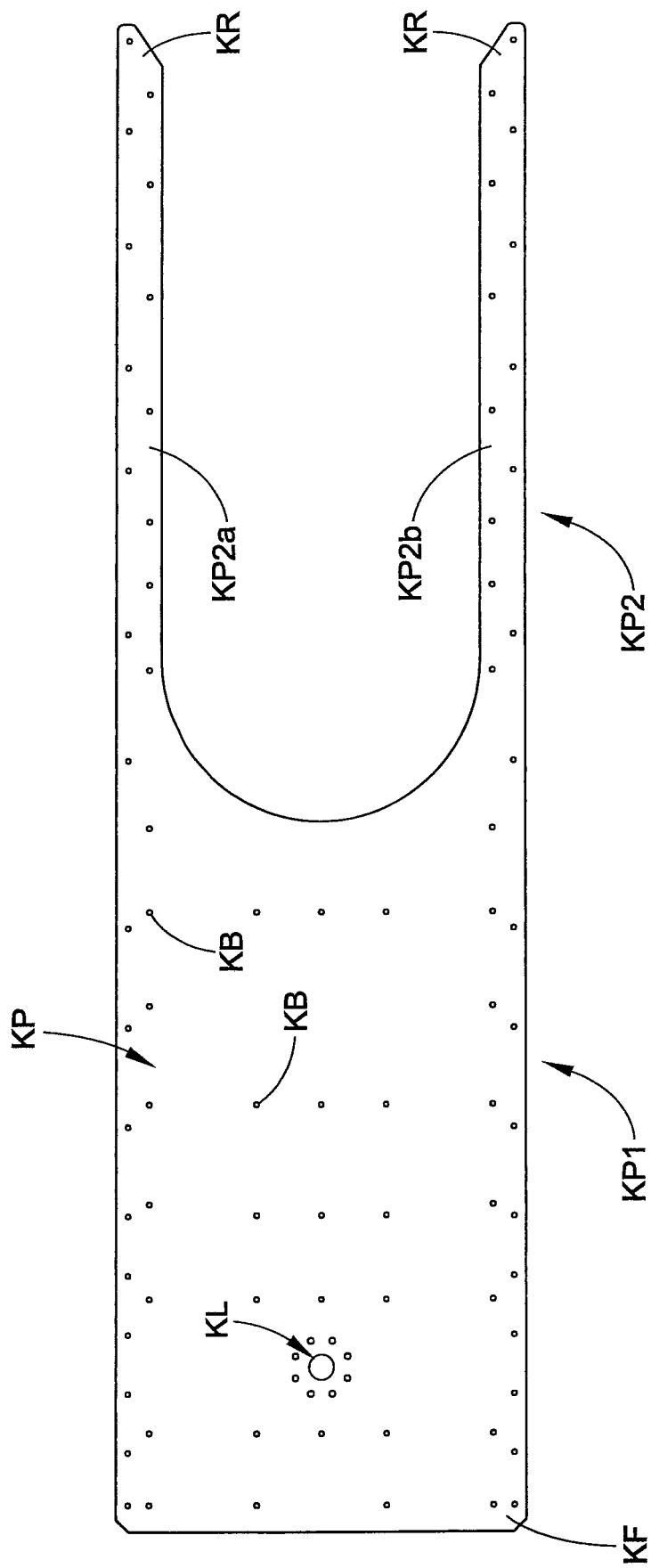
FIG. 14 is a bottom view of a fifth wheel plate that is used for the neck reinforcement structure when constructed using drop deck beams as shown in FIG. 13.

In all embodiments, the beams B1,B2 can alternatively be aluminum drop deck beams as shown in FIG. 13, in which the beams B1,B2 include a neck portion NP, and main portion MP, and a curved goose neck portion GP that defines a shoulder or height transition between the neck portion NP and the main portion MP. Such drop deck beams can be constructed using various methods such as disclosed in U.S. Pat. No. 5,210,921 entitled "Method of Extruded Aluminum Contoured beam Fabrication" assigned to East Manufacturing Corporation, Randolph, Ohio, the entire disclosure of which is hereby expressly incorporated by referenced into the present specification. In the embodiment of FIG. 13, the drop deck beam B1,B2 includes a contoured beam insert BI that defines the goose neck portion GP. In such case, the neck reinforcement structure RS4 is constructed as described above (only the fifth wheel plate KP is shown in FIG. 13 and the remainder of the components are omitted to show the drop deck beam B1,B2). The fifth wheel plate KP for a drop deck beam is provided as shown in FIGS. 13 and 14 such that the main portion KP1 extends from the forward edge KF adjacent the forward end BF of each drop deck beam B1,B2 axially rearward through the beam neck portion NP at least to the beginning of the goose neck portion GP, and the first and second tail portions KP2a,KP2b extend rearward completely through the goose neck portion GP and into the main portion MP of the beams B1,B2 to a rear end KR. Respective rear ends KR of tail portions KP2a,KP2b are located where the beams B1,B2 define the full height H1.

Figure 15:
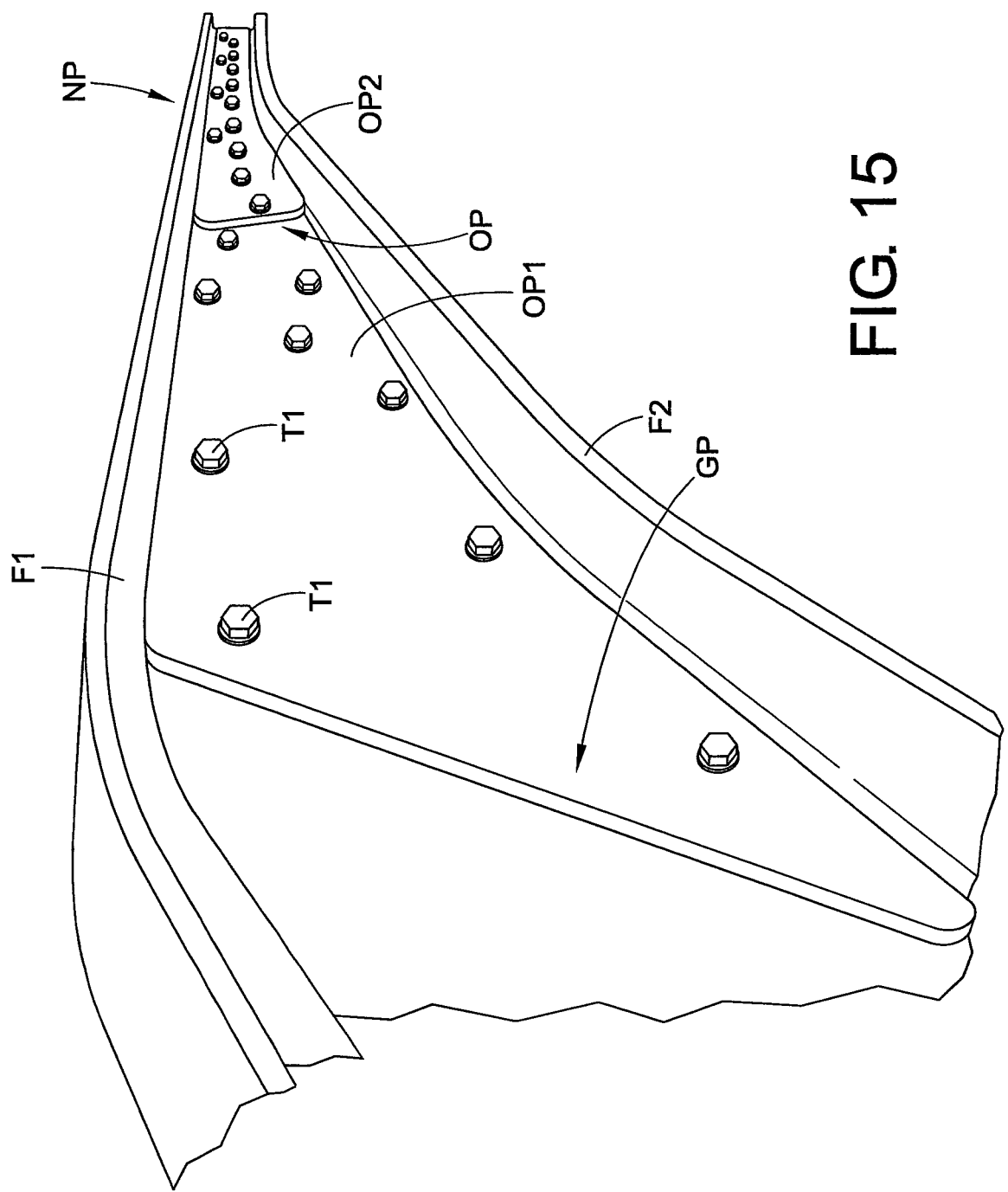
FIG. 15 is a partial perspective view of a drop deck beam and the set of one or more outer reinforcement plates installed thereon.
Figure 16:
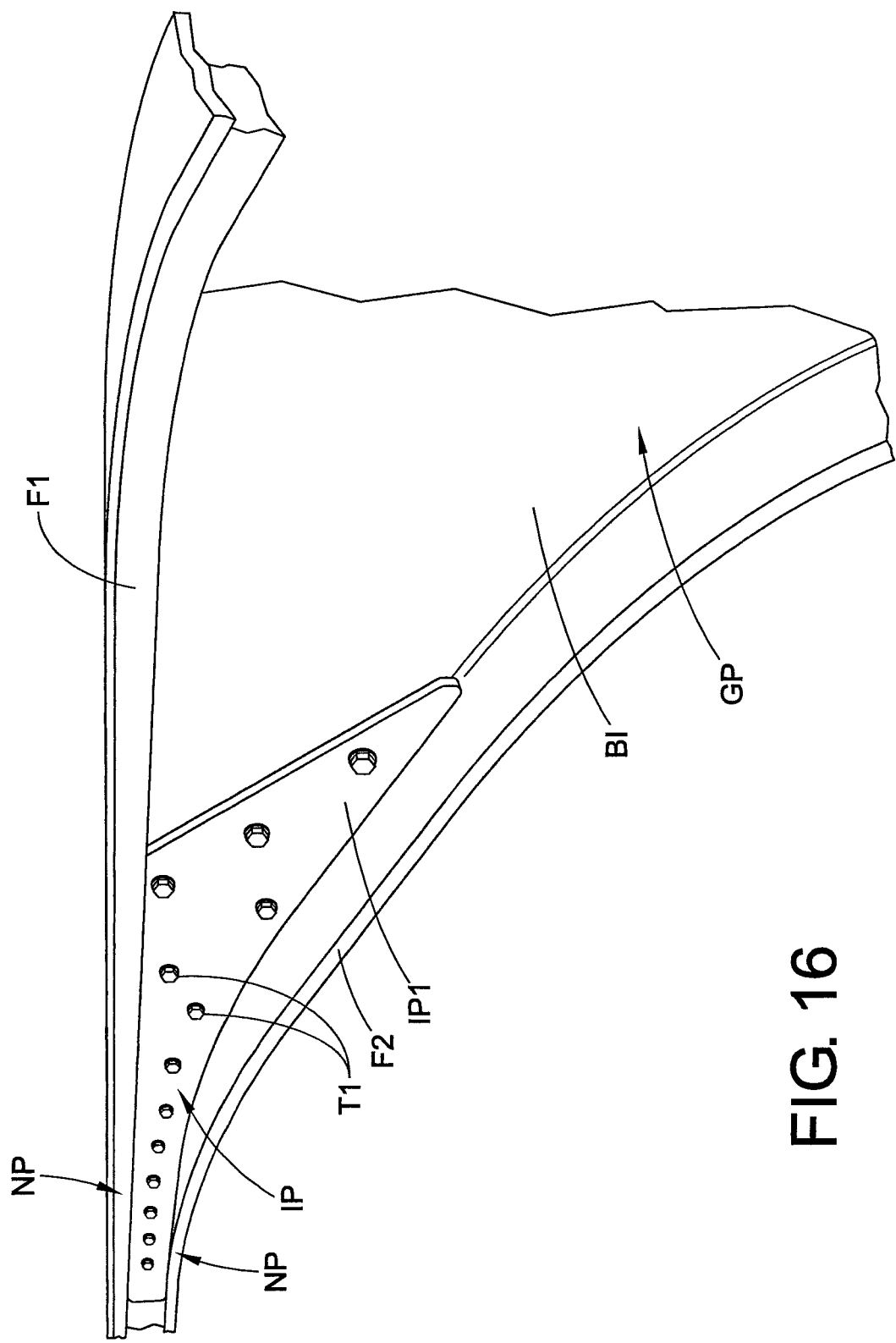
FIG. 16 is a partial perspective view of a drop deck beam and the set of one or more inner reinforcement plates installed thereon.

As shown in FIGS. 15 & 16, it is preferred that the first outer plate OP1 (FIG. 15) and the inner plate IP1 (FIG. 16) extend axially rearward completely through the beam neck portion NP (from adjacent the beam forward end BF) and into the goose neck portion GP of the beam B1,B2 where the beam height H begins to increase as compared to the height H2 in the neck region N. The second outer plate OP2 extends axially rearward to a lesser extent as compared to the first outer plate OP1 as shown in FIG. 15.

Figure 17:
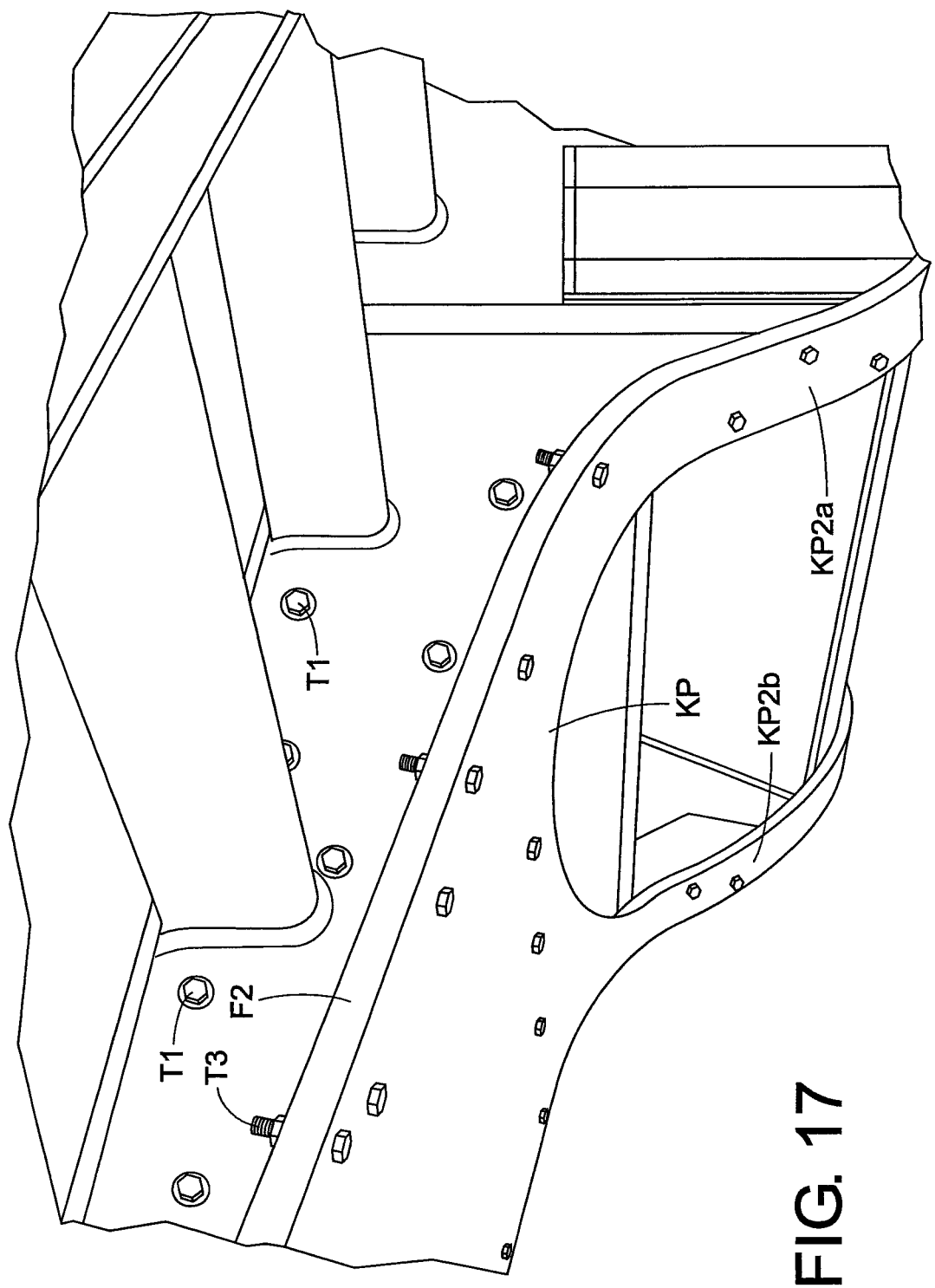
FIG. 17 is a partial perspective view of the fifth wheel plate as used for the reinforcement structure of FIG. 9 when applied to drop deck beams.

FIG. 17 provides another view of the fifth wheel plate KP as used for the reinforcement structure RS4 when applied to drop deck beams B1,B2.

Figure 18:
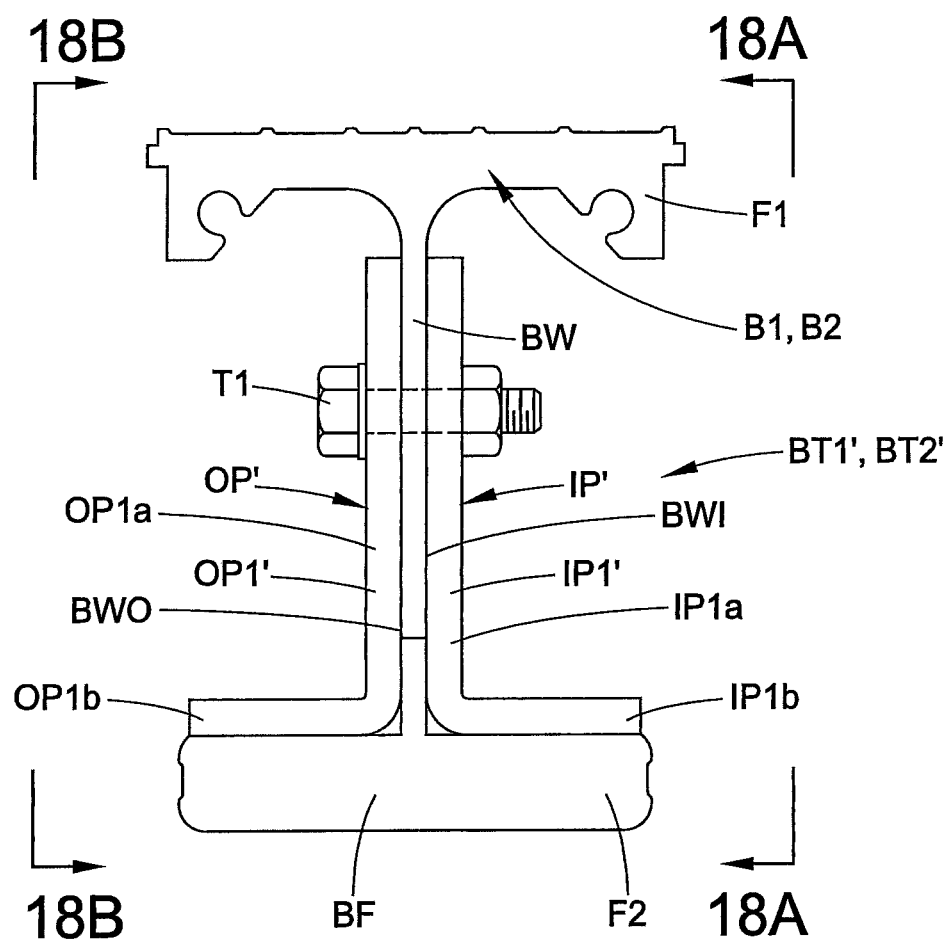
FIG. 18 is a section view of a beam including an alternative beam reinforcement structure that can be used for the neck reinforcement structure of FIG. 9.

FIG. 18 shows a section view of a beam B1,B2 including an alternative beam reinforcement structure BT1',BT2' that is identical to the beam reinforcement structure BT1,BT2 except as otherwise shown and/or described. FIG. 18A is an inner side view taken according to the arrows 18A of FIG. 18, and FIG. 18B is an outer side view taken according to the arrows 18B of FIG. 18. The first and second beam reinforcement structures BT1',BT2' each comprises: (i) a set or stack of one or more longitudinally extending inner reinforcement plates located in abutment with the inner region of the respective beam B1,B2 (the inner region of each beam B1,B2 is the portion that faces the other beam B1,B2); and, (ii) a set or stack of one or more outer longitudinally extending reinforcement plates OP' located in abutment with an outer region of the respective beam B1,B2 (the outer region of each beam B1,B2 located on the opposite side from the inner region of the beam and faces away from the other beam B1,B2). In the illustrated embodiment, the set or stack of one or more outer reinforcement plates OP' includes a single outer plate OP1', and the set or stack of one or more inner reinforcement plates IF includes a single inner plate IP1'. At least the inner plate IP1' is provided as a one-piece or fabricated structure having an L-shaped profile comprising a first leg IP1a and a second leg IP1b perpendicularly or otherwise transversely connected to the first leg IP1a. The first leg IP1a of the inner plate IP1' is abutted with and lies parallel to the inner face BWI of the beam web BW, and the second leg IP1b is abutted with and lies parallel to the second flange F2. As shown, the outer plate PP1' is also provided as a one-piece or fabricated structure having an L-shaped profile comprising a first leg OP1a and a second leg OP1b perpendicularly or otherwise transversely connected to the first leg OP1a. The first leg OP1a of the outer plate OP1' is abutted with and lies parallel to the outer face BWO of the beam web BW, and the second leg OP1b is abutted with and lies parallel to the second flange F2. As such, the beam web BW is located or sandwiched between the first leg IP1a of the inner plate IP1' and the first leg OP1a of the outer plate OP1'. For each of the first and second beams B1,B2, a plurality of first fasteners such as bolts T1 are spaced-apart from each other along the longitudinal axis L and extend through the beam web BW and through the inner and outer reinforcement plates IP,OP (only one fastener T1 is shown in FIG. 18). The fasteners T1 are also spaced different distances from the first and second beam flanges F1,F2 relative to each other. The fasteners T1 secure the inner plate IP1' and outer plates OP1' to the beam web BW such that the beam web BW is sandwiched between the outer plate OP1' and the first/only inner plate IP1'. In one embodiment, the inner plate IP1' is defined from stainless steel (e.g., 304 stainless) and the outer plate OP1' is defined from aluminum plate such as 5086-H34 aluminum alloy or another aluminum plate material. The set or stack of inner reinforcement plates IP' can further include a plate IP1 as described in connection with FIG. 9 stacked on top of the plate IP1' abutted with first leg IP1a, and the set or stack of outer reinforcement plates OP' can further include a plate OP1,OP2 as described in connection with FIG. 9 stacked on top of the plate OP1' or the plate(s) OP1,OP2 as shown in FIG. 9 can be used in place of the L-shaped outer reinforcement plate OP1'.

It is intended that the following claims be construed as broadly as possible, while maintaining their validity, in order to encompass variations, alternatives, modifications, improvements, equivalents, and substantial equivalents of the embodiments and teachings disclosed herein.

The invention claimed is:
1. A platform trailer comprising:
a forward end and a rear end spaced apart from each other along a longitudinal axis;
a cargo supporting platform that extends between said forward end and said rear end and including left and right laterally spaced-apart sides;
a chassis supporting said platform, said chassis comprising first and second beams that extend parallel to said longitudinal axis, said first and second beams each comprising a first height H1;
at least one axle assembly connected to said chassis and comprising left and right rotatable wheel and tire assemblies;
said trailer comprising a neck region where said first and second beams each comprise a second height H2 that is less than 30% of said first height H1;
said trailer further comprising a neck reinforcement structure located in said neck region, said neck reinforcement structure comprising:
a first beam reinforcement structure located adjacent an inner side of said first beam that is oriented toward said second beam;
a second beam reinforcement structure located adjacent an inner side of said second beam that is oriented toward said first beam;
a plurality of internal cross members that extend between and interconnect said first and second beam reinforcement structures; and,
a fifth wheel plate connected to both said first and second beams;
said platform trailer further comprising a kingpin located in said neck region and adapted to be engaged by an associated tractor fifth wheel, wherein said second height H2 of said first and second beams is measured at an axial location along said longitudinal axis where said kingpin is located;
wherein:
said first and second beams each comprise an I-beam profile and include an upper flange, a lower flange, and a web that extends between said upper and lower flanges;
said first beam reinforcement structure comprises a first inner plate abutted with said web of said first beam on an inner side of said first beam that is oriented toward said second beam; and,
said second beam reinforcement structure comprises a second inner plate abutted with said web of said second beam on an inner side of said second beam that is oriented toward said first beam.

2. The platform trailer as set forth in claim 1, wherein said first inner plate is connected to said web of said first beam by a first plurality of primary fasteners, and wherein said second inner plate is connected to said web of said second beam by a second plurality of primary fasteners.

3. The platform trailer as set forth in claim 2, wherein said plurality of internal cross members each comprise a first end welded to said first inner plate and a second end welded to said second inner plate.

4. The platform trailer as set forth in claim 3, wherein a main portion of said fifth wheel plate extending between said first and second beams is connected to at least one of said plurality of internal cross members between said first and second beams by a plurality of fasteners.

5. The platform trailer as set forth in claim 1, wherein: said first beam reinforcement structure further comprises a first outer plate abutted with said web of said first beam on an outer side of said first beam that is opposite said inner side of said first beam such that said web of said first beam is located between said first inner plate and said first outer plate; and, said second beam reinforcement structure further comprises a second outer plate abutted with said web of said second beam on an outer side of said second beam that is opposite said inner side of said second beam such that said web of said second beam is located between said second inner plate and said second outer plate.

6. The platform trailer as set forth in claim 5, wherein: said first inner plate and said first outer plate are connected to said web of said first beam by a first plurality of primary fasteners that each extend through said first inner plate, said web of said first beam, and said first outer plate; and, said second inner plate and said second outer plate are connected to said web of said second beam by a second plurality of primary fasteners that each extend through said second inner plate, said web of said second beam, and said second outer plate.

7. The platform trailer as set forth in claim 1, wherein the second beam height H2 is less than 25% of the first beam height H1 such that:

H2<0.25*H1.

8. The platform trailer as set forth in claim 1, wherein said first and second beams are defined from aluminum alloy and said first and second beam reinforcement structures are at least partially defined from a metal other than aluminum alloy.

* * * * *